(12) United States Patent
Nangare

(10) Patent No.: US 12,166,595 B2
(45) Date of Patent: Dec. 10, 2024

(54) ETHERNET PHYSICAL LAYER TRANSCEIVER WITH NON-LINEAR NEURAL NETWORK EQUALIZERS

(71) Applicant: Marvell Asia Pte Ltd, Singapore (SG)

(72) Inventor: Nitin Nangare, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 66 days.

(21) Appl. No.: 17/648,834

(22) Filed: Jan. 25, 2022

(65) Prior Publication Data

US 2022/0239510 A1    Jul. 28, 2022

Related U.S. Application Data

(60) Provisional application No. 63/141,460, filed on Jan. 25, 2021.

(51) Int. Cl.
  *H04L 12/10*   (2006.01)
  *H04L 25/02*   (2006.01)
  *H04L 25/03*   (2006.01)

(52) U.S. Cl.
  CPC .......... *H04L 12/10* (2013.01); *H04L 25/0234* (2013.01); *H04L 25/0252* (2013.01); *H04L 25/0254* (2013.01); *H04L 25/03878* (2013.01)

(58) Field of Classification Search
  CPC ........................ H04L 25/0254; H04L 25/0234
  See application file for complete search history.

(56) References Cited

U.S. PATENT DOCUMENTS

529 A * 12/1837 Hobbs ..................... E05B 65/50
                                                                62/345
5,963,929 A   10/1999 Lo
(Continued)

FOREIGN PATENT DOCUMENTS

AU    2004231907 A1 * 11/2004   ........ H03M 13/2975
AU    2020101786 A4 *  9/2020
(Continued)

OTHER PUBLICATIONS

Q. Zhou, F. Zhang and C. Yang, "AdaNN: Adaptive Neural Network-Based Equalizer via Online Semi-Supervised Learning," in Journal of Lightwave Technology, vol. 38, No. 16, pp. 4315-4324, 15 Aug. 15, 2020, doi: 10.1109/JLT.2020.2991028. (Year: 2020).*
(Continued)

*Primary Examiner* — Berhanu Tadese

(57) ABSTRACT

A physical layer transceiver for connecting a host device to a wireline channel medium includes a host interface for coupling to the host device, a line interface for coupling to the channel medium, a transmit path operatively coupled to the host interface and the line interface, a receive path operatively coupled to the line interface and the host interface, and adaptive filter circuitry operatively coupled to at least one of the transmit path and the receive path for filtering signals on the at least one of the transmit path and the receive path, the adaptive filter circuitry including a non-linear equalizer. The non-linear equalizer may be a neural network equalizer based on a multi-layer perceptron or a radial-basis function, or may be a linear equalizer with a non-linear activation function. The non-linear equalizer also may have a front-end filter to reduce input complexity.

25 Claims, 19 Drawing Sheets

(56) References Cited

U.S. PATENT DOCUMENTS

| | | | | |
|---|---|---|---|---|
| 5,991,308 A * | 11/1999 | Fuhrmann | H04J 13/00 | 348/E7.07 |
| 6,052,349 A * | 4/2000 | Okamoto | G11B 20/10055 | 369/47.26 |
| 6,158,271 A * | 12/2000 | de Corral | G01N 11/08 | 73/861.51 |
| 6,236,749 B1 * | 5/2001 | Satonaka | G06V 10/751 | 382/250 |
| 6,246,962 B1 * | 6/2001 | Schultz | G01V 1/48 | 702/6 |
| 6,304,539 B1 * | 10/2001 | Okamoto | G11B 20/10009 | 369/59.22 |
| 6,307,868 B1 * | 10/2001 | Rakib | H04L 5/06 | 375/325 |
| 6,356,555 B1 * | 3/2002 | Rakib | H04H 60/97 | 370/479 |
| 6,377,640 B2 * | 4/2002 | Trans | H04L 1/0047 | 375/354 |
| 6,381,083 B1 * | 4/2002 | Abarbanel | H04L 25/03165 | |
| 6,434,084 B1 * | 8/2002 | Schultz | E21B 47/16 | 340/854.4 |
| 6,665,308 B1 * | 12/2003 | Rakib | H04L 27/362 | 370/479 |
| 6,687,235 B1 * | 2/2004 | Chu | H04B 3/23 | 379/406.01 |
| 6,831,900 B2 * | 12/2004 | Blake | H04B 3/23 | 370/290 |
| 6,894,989 B1 * | 5/2005 | Chadha | H04B 3/23 | 370/290 |
| 6,937,617 B2 * | 8/2005 | Rakib | H04N 7/10 | 370/479 |
| 6,983,047 B1 * | 1/2006 | Chadha | H04B 3/23 | 379/406.01 |
| 7,016,440 B1 * | 3/2006 | Singer | H04L 25/03171 | 375/348 |
| 7,020,165 B2 * | 3/2006 | Rakib | H03M 13/256 | 348/E7.07 |
| 7,031,344 B2 * | 4/2006 | Rakib | H04L 25/4921 | 370/479 |
| 7,095,707 B2 * | 8/2006 | Rakib | H04N 7/17309 | 370/204 |
| 7,158,566 B2 * | 1/2007 | Dowling | H04L 25/03057 | 375/229 |
| 7,239,650 B2 * | 7/2007 | Rakib | H04L 5/026 | 370/480 |
| 7,454,684 B2 * | 11/2008 | Allpress | H03M 13/2993 | 714/755 |
| 7,764,622 B2 * | 7/2010 | El-Damhougy | H04B 7/18584 | 370/252 |
| 7,885,031 B1 | 2/2011 | Han | | |
| 8,046,200 B2 * | 10/2011 | Kirby | G06F 17/175 | 703/2 |
| 8,107,329 B1 * | 1/2012 | Painter | G11B 7/0906 | 369/44.41 |
| 8,363,517 B1 * | 1/2013 | Painter | G11B 20/10037 | 369/44.14 |
| 8,416,659 B1 * | 4/2013 | Xie | G11B 20/10046 | 369/47.17 |
| 8,521,488 B2 * | 8/2013 | Kirby | G06F 17/175 | 703/2 |
| 8,611,411 B2 * | 12/2013 | Hayami | G11B 20/10009 | 375/232 |
| 8,634,284 B1 * | 1/2014 | Painter | G11B 7/0908 | 369/44.41 |
| 8,896,682 B2 * | 11/2014 | Bressler | A61B 3/0025 | 348/78 |
| 9,484,974 B2 * | 11/2016 | Tu | H04B 1/123 | |
| 9,754,163 B2 * | 9/2017 | Segalovitz | G06T 5/92 | |
| 9,928,824 B2 * | 3/2018 | Barath | G10K 11/17854 | |
| 10,038,575 B1 | 7/2018 | Steffan et al. | | |
| 10,147,442 B1 * | 12/2018 | Panchapagesan | G06N 3/04 | |
| 10,388,272 B1 * | 8/2019 | Thomson | G10L 15/22 | |
| 10,475,471 B2 * | 11/2019 | Ebenezer | G10L 25/21 | |
| 10,531,415 B2 * | 1/2020 | O'Shea | G06N 3/045 | |
| 10,573,312 B1 * | 2/2020 | Thomson | G10L 15/22 | |
| 10,672,383 B1 * | 6/2020 | Thomson | G06N 20/00 | |
| 10,797,805 B1 | 10/2020 | Mirfakhraei et al. | | |
| 10,833,785 B1 | 11/2020 | O'Shea et al. | | |
| 10,847,137 B1 * | 11/2020 | Mandal | G10L 15/16 | |
| 10,971,153 B2 * | 4/2021 | Thomson | G10L 15/30 | |
| 10,979,097 B2 * | 4/2021 | Luo | H04L 5/1461 | |
| 10,985,951 B2 * | 4/2021 | Li | G06N 3/045 | |
| 11,017,778 B1 * | 5/2021 | Thomson | H04M 3/42382 | |
| 11,050,494 B2 * | 6/2021 | Baek | H04W 52/42 | |
| 11,055,615 B2 * | 7/2021 | Litichever | H04L 12/40 | |
| 11,074,495 B2 * | 7/2021 | Zadeh | G06F 18/2413 | |
| 11,074,925 B2 * | 7/2021 | Bryan | G06N 20/00 | |
| 11,145,312 B2 * | 10/2021 | Thomson | G10L 15/32 | |
| 11,145,331 B1 * | 10/2021 | Nangare | G11B 20/10046 | |
| 11,170,761 B2 * | 11/2021 | Thomson | G10L 15/06 | |
| 11,195,057 B2 * | 12/2021 | Zadeh | G06N 3/006 | |
| 11,240,579 B2 * | 2/2022 | Jumbe | A61B 5/0531 | |
| 11,255,663 B2 * | 2/2022 | Binder | G01B 15/00 | |
| 11,270,200 B2 | 3/2022 | Zhang et al. | | |
| 11,271,699 B1 | 3/2022 | Eyuboglu et al. | | |
| 11,310,084 B2 * | 4/2022 | Shen | H04L 25/0212 | |
| 11,356,182 B2 * | 6/2022 | Ye | H04B 10/272 | |
| 11,438,014 B2 * | 9/2022 | Belzer | H03M 13/6325 | |
| 11,451,419 B2 * | 9/2022 | Li | H04B 1/16 | |
| 11,495,248 B2 * | 11/2022 | Musha | G11B 5/4893 | |
| 11,496,341 B2 * | 11/2022 | Luo | G06N 3/045 | |
| 11,509,509 B2 * | 11/2022 | Razavi Majomard | H04L 25/03885 | |
| 11,516,053 B2 * | 11/2022 | Ye | H04L 25/03159 | |
| 11,568,214 B2 * | 1/2023 | Tullberg | G06N 5/01 | |
| 11,570,023 B2 * | 1/2023 | Nangare | H04L 25/03057 | |
| 11,575,544 B2 * | 2/2023 | Andrews | G06N 3/08 | |
| 11,677,595 B2 * | 6/2023 | Razavi Majomard | H04B 3/14 | 375/232 |
| 2001/0034216 A1 | 10/2001 | Creigh et al. | | |
| 2002/0150059 A1 * | 10/2002 | Blake | H04B 3/23 | 370/286 |
| 2002/0181633 A1 * | 12/2002 | Trans | H04L 1/0002 | 375/354 |
| 2005/0220185 A1 | 10/2005 | Dowling | | |
| 2006/0039550 A1 * | 2/2006 | Chadha | H04B 3/23 | 379/406.09 |
| 2008/0319375 A1 * | 12/2008 | Hardy | B82Y 5/00 | 600/431 |
| 2014/0146867 A1 | 5/2014 | Shvydun et al. | | |
| 2018/0204111 A1 * | 7/2018 | Zadeh | G06V 10/764 | |
| 2019/0154439 A1 | 5/2019 | Binder | | |
| 2019/0385057 A1 * | 12/2019 | Litichever | H04L 63/14 | |
| 2020/0184278 A1 * | 6/2020 | Zadeh | G06N 3/044 | |
| 2020/0293894 A1 | 9/2020 | Kwon et al. | | |
| 2020/0294401 A1 * | 9/2020 | Kerecsen | G08G 1/205 | |
| 2020/0295975 A1 * | 9/2020 | Li | H04L 25/03165 | |
| 2020/0389469 A1 * | 12/2020 | Litichever | H04W 4/40 | |
| 2021/0218606 A1 * | 7/2021 | Shen | H04L 25/0212 | |
| 2021/0345939 A1 * | 11/2021 | Jumbe | H04R 1/028 | |
| 2021/0350237 A1 * | 11/2021 | Litichever | G06N 3/08 | |
| 2021/0399927 A1 * | 12/2021 | Razavi Majomard | H04B 3/32 | |
| 2022/0014401 A1 | 1/2022 | Zhu et al. | | |
| 2022/0128352 A1 * | 4/2022 | Binder | G01B 15/00 | |
| 2022/0131724 A1 * | 4/2022 | Razavi Majomard | H04L 25/03044 | |
| 2022/0150094 A1 * | 5/2022 | Nangare | H04L 25/03885 | |
| 2022/0224361 A1 * | 7/2022 | Alic | G06N 3/08 | |
| 2022/0239510 A1 * | 7/2022 | Nangare | G06N 3/048 | |
| 2022/0385374 A1 * | 12/2022 | Arikawa | H04B 10/616 | |
| 2023/0021633 A1 * | 1/2023 | Li | H04L 25/03165 | |
| 2023/0216724 A1 * | 7/2023 | Sundberg | H04L 27/3483 | 370/329 |
| 2023/0275787 A1 * | 8/2023 | Vitthaladevuni | H04L 25/0254 | 706/23 |

FOREIGN PATENT DOCUMENTS

| | | | | |
|---|---|---|---|---|
| CN | 1485798 A * | 3/2004 | | H03M 13/256 |
| CN | 1310186 C * | 4/2007 | | H04L 25/03006 |

(56) References Cited

FOREIGN PATENT DOCUMENTS

| | | | | |
|---|---|---|---|---|
| CN | 107342814 A | * | 11/2017 | ............ H04B 10/116 |
| CN | 108363967 A | * | 8/2018 | ............ H04B 10/116 |
| CN | 108399366 A | * | 8/2018 | ............ H04B 10/116 |
| CN | 108650201 A | * | 10/2018 | ........ H04L 25/03006 |
| CN | 108683428 A | * | 10/2018 | ............. G06F 21/44 |
| CN | 109067688 A | * | 12/2018 | ............ H04L 25/025 |
| CN | 109379120 A | * | 2/2019 | ............ H04B 7/0413 |
| CN | 109753978 A | * | 5/2019 | ............ G06F 18/241 |
| CN | 109995449 A | * | 7/2019 | ........... G06N 3/0454 |
| CN | 110198282 A | * | 9/2019 | ........ H04L 25/03012 |
| CN | 110211611 A | * | 9/2019 | ........ H04L 25/03006 |
| CN | 110233812 | | 9/2019 | |
| CN | 110325929 A | * | 10/2019 | ............ G05B 19/042 |
| CN | 110326308 A | * | 10/2019 | ............. G06N 20/00 |
| CN | 110365613 A | * | 10/2019 | ........ H04L 25/03006 |
| CN | 110392006 A | * | 10/2019 | ............. G06N 20/20 |
| CN | 110446160 A | * | 11/2019 | |
| CN | 110533027 A | * | 12/2019 | ............ G06F 18/214 |
| CN | 110547824 A | * | 12/2019 | ............... A61B 7/04 |
| CN | 110598859 A | * | 12/2019 | ........... G06N 3/0445 |
| CN | 110636020 A | * | 12/2019 | ............. G06N 3/084 |
| CN | 108683428 B | * | 4/2020 | ............. G06F 21/44 |
| CN | 111191573 A | * | 5/2020 | ........ H04L 25/03006 |
| CN | 110198282 B | * | 6/2020 | ........ H04L 25/03012 |
| CN | 110211611 B | * | 6/2020 | ........ H04L 25/03006 |
| CN | 111630787 A | * | 9/2020 | ........... G06N 3/0454 |
| CN | 111683025 A | * | 9/2020 | ........... G06N 3/0445 |
| CN | 111740934 A | * | 10/2020 | ........... G06N 3/0454 |
| CN | 111786915 A | * | 10/2020 | ............ H04B 7/0854 |
| CN | 108650201 B | * | 11/2020 | ........ H04L 25/03006 |
| CN | 109995449 B | * | 12/2020 | ........... G06N 3/0454 |
| CN | 110636020 B | * | 1/2021 | ............. G06N 3/084 |
| CN | 110197218 B | * | 2/2021 | ............ G06K 9/6217 |
| CN | 111565160 B | * | 3/2021 | ........ H04L 25/03006 |
| CN | 112532548 A | * | 3/2021 | ............. G06N 3/045 |
| CN | 110325929 B | * | 5/2021 | ............ G05B 19/042 |
| CN | 109067688 B | * | 9/2021 | ............ H04L 25/025 |
| CN | 110392006 B | * | 1/2022 | ............. G06N 20/20 |
| CN | 111488734 B | * | 2/2022 | ............. G06F 16/35 |
| CN | 110505020 | | 3/2022 | |
| CN | 114342272 A | * | 4/2022 | ............ H04B 1/0475 |
| CN | 114664288 A | * | 6/2022 | ........ H04L 25/03006 |
| CN | 111740934 B | * | 8/2022 | ........... G06N 3/0454 |
| CN | 110533027 B | * | 9/2022 | ............ G06F 18/214 |
| CN | 111565051 B | * | 11/2022 | ......... H03M 13/1148 |
| CN | 110598859 B | * | 12/2022 | ........... G06N 3/0445 |
| CN | 111630787 B | * | 12/2022 | ........... G06N 3/0454 |
| CN | 109753978 B | * | 2/2023 | ............ G06F 18/241 |
| CN | 111786915 B | * | 3/2023 | ............ H04B 7/0854 |
| CN | 110399929 B | * | 4/2023 | ............ G06F 18/241 |
| CN | 116054888 A | * | 5/2023 | ........ H04L 25/03057 |
| CN | 110741553 B | * | 11/2023 | ........... G06N 3/0445 |
| DE | 69620781 T9 | * | 5/2007 | ........... H03M 13/256 |
| DE | 112021005915 T5 | * | 8/2023 | ........ H04L 25/03057 |
| EP | 1107597 A2 | * | 6/2001 | ........... H03M 13/256 |
| EP | 1107598 A2 | * | 6/2001 | ........... H03M 13/256 |
| EP | 1107599 A2 | * | 6/2001 | ........... H03M 13/256 |
| EP | 1130918 A2 | * | 9/2001 | ........... H03M 13/256 |
| EP | 1130919 A2 | * | 9/2001 | ........... H03M 13/256 |
| EP | 1187360 A2 | * | 3/2002 | ............... H04B 3/23 |
| EP | 1107599 B1 | * | 3/2006 | ........... H03M 13/256 |
| EP | 2 148 446 | | 1/2010 | |
| EP | 1107598 B1 | * | 7/2010 | ........... H03M 13/256 |
| EP | 1187360 B1 | * | 9/2012 | ............... H04B 3/23 |
| EP | 3809611 | | 12/2019 | |
| EP | 3535625 B1 | * | 2/2021 | ............ G05B 19/042 |
| EP | 3993275 A1 | * | 5/2022 | ............. G06N 3/084 |
| EP | 4088385 A1 | * | 11/2022 | ............... H04B 3/23 |
| EP | 3673580 B1 | * | 10/2023 | ............. G06N 3/04 |
| EP | 4270381 A2 | * | 11/2023 | ........ G10K 11/17823 |
| FR | 3118519 A1 | * | 7/2022 | ............. G06N 3/045 |
| GB | 2557425 A | * | 6/2018 | ............. G10L 15/02 |
| JP | 2002141839 A | * | 5/2002 | ............... H04B 3/23 |
| JP | 3507080 B2 | * | 3/2004 | ........... H03M 13/256 |
| JP | 3764269 B2 | * | 4/2006 | ............. G06N 3/049 |
| JP | 4314553 B2 | * | 8/2009 | ............... H04B 3/23 |
| KR | 10-2009-0109380 | | 10/2009 | |
| WO | WO-9708861 A1 | * | 3/1997 | ......... H03M 13/256 |
| WO | WO-2004095711 A1 | * | 11/2004 | ........ H03M 13/2975 |
| WO | WO-2008157422 A1 | * | 12/2008 | ........ A61K 41/0028 |
| WO | WO2015/198271 | | 12/2015 | |
| WO | WO-2016040583 A1 | * | 3/2016 | ............ H04B 1/123 |
| WO | WO-2016040590 A1 | * | 3/2016 | ............... H04B 1/40 |
| WO | WO-2016040644 A1 | * | 3/2016 | ............ H04B 1/525 |
| WO | WO-2016108166 A1 | * | 7/2016 | ....... G10K 11/17823 |
| WO | WO-2017149526 A2 | * | 9/2017 | ........... G01B 11/026 |
| WO | WO-2018071387 A1 | * | 4/2018 | ............. G10L 15/02 |
| WO | WO-2018104929 A1 | * | 6/2018 | ........... G05B 19/042 |
| WO | WO 2019/038693 | | 2/2019 | |
| WO | WO-2019043446 A1 | * | 3/2019 | ........... G05D 1/0287 |
| WO | WO-2019082239 A1 | * | 5/2019 | ....... H04L 25/03057 |
| WO | WO-2019165969 A1 | * | 9/2019 | ....... H04L 25/03012 |
| WO | WO-2019169400 A1 | * | 9/2019 | ............. G06N 20/00 |
| WO | WO2019/191099 | | 10/2019 | |
| WO | WO-2020092391 A1 | * | 5/2020 | ............. G06N 3/08 |
| WO | WO-2020117504 A1 | * | 6/2020 | ......... G06F 21/6245 |
| WO | WO-2020117505 A1 | * | 6/2020 | ............. G10L 15/22 |
| WO | WO-2020117506 A1 | * | 6/2020 | ........... G10L 15/187 |
| WO | WO-2020117507 A1 | * | 6/2020 | ........... G10L 15/063 |
| WO | WO-2021045862 A1 | * | 3/2021 | ............ H04B 1/0475 |
| WO | WO-2021142189 A1 | * | 7/2021 | ............... H04B 3/23 |
| WO | WO-2021203242 A1 | * | 10/2021 | ........... G06N 3/0454 |
| WO | WO-2021262052 A1 | * | 12/2021 | ............. G06N 3/045 |
| WO | WO-2021262811 A1 | * | 12/2021 | ............... H04B 3/23 |
| WO | WO-2022087388 A1 | * | 4/2022 | ............... H04B 3/14 |
| WO | WO-2022103422 A1 | * | 5/2022 | ....... H04L 25/03057 |
| WO | WO-2022159870 A1 | * | 7/2022 | ............. G06N 3/048 |

OTHER PUBLICATIONS

K. L. Sheeja and P. K. Sahu, "Decision Feedback Equalization Using RBF and MLP Networks," 2010 Second Vaagdevi International Conference on Information Technology for Real World Problems, Warangal, India, 2010, pp. 96-101, doi: 10.1109/VCON.2010. 27. (Year: 2010).*

Z. Zerdoumi, D. Chikouche and D. Benatia, "Adaptive decision feedback equalizer based neural network for nonlinear channels," 3rd International Conference on Systems and Control, Algiers, Algeria, 2013, pp. 850-855, doi: 10.1109/ICoSC.2013.6750956. (Year: 2013).*

I. Santamaria, D. Erdogmus and J. C. Principe, "Entropy minimization for supervised digital communications channel equalization," in IEEE Transactions on Signal Processing, vol. 50, No. 5, pp. 1184-1192, May 2002, doi: 10.1109/78.995074. (Year: 2002).*

S. Chen, B. Mulgrew and P. M. Grant, "A clustering technique for digital communications channel equalization using radial basis function networks," in IEEE Transactions on Neural Networks, vol. 4, No. 4, pp. 570-590, Jul. 1993, doi: 10.1109/72.238312. (Year: 1993).*

F. J. González-Serrano, F. Pérez-Cruz and A. Artés-Rodríguez, "Reduced-complexity decision-feedback equalizer for nonlinear channels," 9th European Signal Processing Conference (EUSIPCO 1998), Rhodes, Greece, 1998, pp. 1-4. (Year: 1998).*

J. Shen et al. Nonlinear Equalization for TDMR Channels Using Neural Networks, Dec. 2019. Retrieved from https://arxiv.org/pdf/ 1912.07818 on Dec. 20, 2023 (Year: 2019).*

Z. Zerdoumi et al., "Adaptive decision feedback equalizer based neural network for nonlinear channels," 3rd International Conference on Systems and Control, Algiers, Algeria, 2013, pp. 850-855, doi: 10.1109/ICoSC.2013.6750956. (Year: 2013).*

Zerdoumi et al., "Adaptive decision feedback equalizer based neural network for nonlinear channels", IEEE 2013 (Year: 2013).*

Shen et al. "Nonlinear Equalization for TDMR Channels Using Neural Networks", Dec. 2019 (Year: 2019).*

Shen, J., et al., "Nonlinear Equalization for TDMR Channels Using Neural Networks", *2020 54th Annual Conference on Information Sciences and Systems (CISS)*, IEEE, pp. 1-6 (Mar. 18, 2020).

Sheeja, K.L., et al., "Decision Feedback Equalization Using RBF and MLP Networks," *2010 Second Vaagdevi International Confer-*

(56) References Cited

OTHER PUBLICATIONS

*ence on Information Technology for Real World Problems (VCON)*, IEEE, pp. 96-101 (Dec. 9, 2010).

Zerdoumi, Z., et al., "Adaptive Decision Feedback Equalizer Based Neural Network for Nonlinear Channels," *Proceedings of the 3rd International Conference on Systems and Control*, Oct. 29-31, 2013 (6 pages).

Zhou, Qingyi, et al., "AdaNN: Adaptive Neural Network-based Equalizer via Online Semi-supervised Learning," ARXIV.Org, Cornell University Library, Jul. 24, 2019 (10 pages).

Satapathy, J. K., et al., "A highly efficient channel equalizer for digital communication system in Neural Network paradigm," *2009 Innovative Technologies in Intelligent Systems and Industrial Applications*, pp. 11-16 (2009).

\* cited by examiner

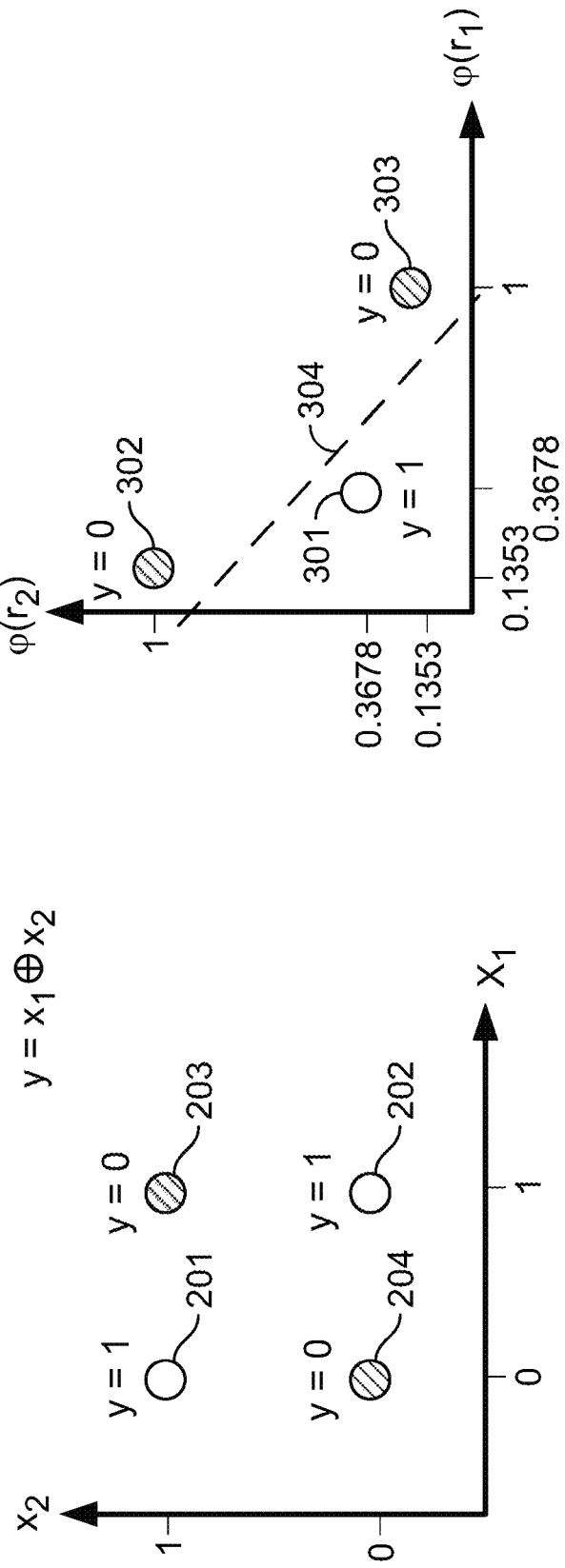

ETHERNET PHYSICAL LAYER TRANSCEIVER WITH NON-LINEAR NEURAL NETWORK EQUALIZERS

CROSS REFERENCE TO RELATED APPLICATION

This disclosure claims the benefit of, commonly-assigned U.S. Provisional Patent Application No. 63/141,460, filed Jan. 25, 2021, which is hereby incorporated by reference herein in its entirety.

FIELD OF USE

This disclosure relates to the use of non-linear equalizers in a physical layer transceiver. More particularly, this disclosure relates to the use of non-linear neural-network equalizers in the transmit and receive paths of a physical layer transceiver such as an Ethernet physical layer transceiver, as well as for cancellation echo, near-end crosstalk, and far-end crosstalk.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Many integrated circuit devices, particularly "systems-on-chip" (SoCs), include high-speed serial links between various device components (such as the individual silicon dice in an SoC). Typical high-speed serial links of that type, commonly known as "SERDES" (serializer/deserializer), may suffer from significant non-linearity or channel impairment in the signal path, as a result of, e.g., insertion loss, inter-symbol-interference (ISI), and, in an optical system, non-linearities such as dispersion loss, or, in a copper (i.e., wired) system, cross-talk, jitter, etc. Various forms of linear equalization typically are used, at the receiver end of such links, to attempt to mitigate such channel impairments. However, linear equalization may not be sufficient to compensate for such non-linearities, particularly when the signal levels (e.g., voltage levels) to be distinguished in a data signal are close together and there is a low signal-to-noise ratio (SNR).

SUMMARY

In accordance with implementations of the subject matter of this disclosure, a physical layer transceiver for connecting a host device to a wireline channel medium includes a host interface for coupling to the host device, a line interface for coupling to the wireline channel medium, a transmit path operatively coupled to the host interface and the line interface, including circuitry for encoding host data and driving encoded host data onto the wireline channel medium, a receive path operatively coupled to the line interface and the host interface, including circuitry for decoding data received from the wireline channel medium and passing the decoded data to the host interface, and adaptive filter circuitry operatively coupled to at least one of the transmit path and the receive path for filtering signals on the at least one of the transmit path and the receive path, the adaptive filter circuitry comprising a non-linear equalizer.

In a first implementation of such a physical layer transceiver, the adaptive filter circuitry may include a non-linear equalizer inline in the transmit path and configured to equalize transmit signals.

In a second implementation of such a physical layer transceiver, the adaptive filter circuitry may include a non-linear equalizer inline in the receive path and configured to equalize received signals.

In a third implementation of the subject matter of this disclosure, the adaptive filter circuitry may include non-linear echo cancellation circuitry coupled to both the transmit path and the receive path and configured to cancel echo between the transmit path and the receive path.

According to a first aspect of that third implementation, the adaptive filter circuitry may include non-linear echo cancellation circuitry operating in an analog domain of the physical layer transceiver.

According to a second aspect of that third implementation, the adaptive filter circuitry may include non-linear echo cancellation circuitry operating in a digital domain of the physical layer transceiver.

According to a fourth aspect of that third implementation, the adaptive filter circuitry may include non-linear crosstalk cancellation circuitry coupled to both the transmit path and the receive path for cancelling at least one of (a) near-end crosstalk, and (b) far-end crosstalk, between the transmit path and the receive path.

A fourth implementation of such a physical layer transceiver may further include adaptation circuitry configured to compare output of the adaptive filter circuitry to known data and to adapt the adaptive filter circuitry based on a cost function to reduce error in the output on a subsequent iteration.

In a fifth implementation of such a physical layer transceiver, the adaptation circuitry may be configured to adapt the adaptive filter circuitry based on cross-entropy between a respective bit and a log-likelihood ratio corresponding to the respective bit.

In a sixth implementation of such a physical layer transceiver, the non-linear equalizer may include a neural network equalizer.

According to a first aspect of that sixth implementation, the neural network equalizer may include a multi-layer perceptron neural network equalizer.

According to a second aspect of that sixth implementation, the neural network equalizer may include a radial-basis function neural network equalizer.

According to a third aspect of that sixth implementation, the neural network equalizer may be a reduced complexity neural network equalizer including a front-end filter having a first number of inputs and a second number of outputs, the second number being smaller than the first number, and a neural network filter having as inputs the outputs of the front-end filter.

In a first instance of that third aspect of the sixth implementation, the front-end filter of the reduced complexity neural network equalizer may include a finite-impulse-response filter to reduce the first number of inputs to the second number of inputs.

In a seventh implementation of such physical layer transceiver, the non-linear equalizer may include a linear filter and a non-linear activation function.

According to a first aspect of that seventh implementation, the non-linear activation function may be a hyperbolic tangent function.

According to a first aspect of that seventh implementation, the non-linear activation function may be a sigmoid function.

In accordance with implementations of the subject matter of this disclosure, a method of filtering interference in a physical layer transceiver for connecting a host device to a wireline channel medium includes performing non-linear equalization on at least one of the transmit path and the receive path for filtering signals on the at least one of the transmit path and the receive path, and adapting the non-linear equalizer based on cross-entropy between equalizer output and data signals on the wireline channel medium.

In a first implementation of such a method, performing non-linear equalization on at least one of the transmit path and the receive path may include performing non-linear equalization inline in the transmit path to equalize transmit signals.

In a second implementation of such a method, performing non-linear equalization on at least one of the transmit path and the receive path may include performing non-linear equalization inline in the receive path to equalize received signals.

In a third implementation of such a method, performing non-linear equalization may include performing non-linear echo cancellation between the transmit path and the receive path.

In a fourth implementation of such a method, performing non-linear equalization may include performing non-linear crosstalk cancellation for cancelling at least one of (a) near-end crosstalk, and (b) far-end crosstalk, between the transmit path and the receive path.

In a fifth implementation of such a method, performing non-linear equalization may include applying a non-linear activation function and performing linear filtering.

According to a first aspect of that fifth implementation, applying a non-linear activation function may include applying a hyperbolic tangent function.

According to a second aspect of that fifth implementation, applying a non-linear activation function may include applying a sigmoid function.

A sixth implementation of such a method may further include applying initial filtering of equalization inputs prior to performing the non-linear equalization, to reduce complexity by reducing number of inputs to the non-linear equalization.

According to a first aspect of that sixth implementation, applying initial filtering may include applying finite-impulse-response filtering.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 3 is a plot of an exclusive-OR function in a Cartesian coordinate space illustrating a problem solved by implementations of the subject matter of this disclosure;

FIG. 4 is a plot of a transformation of the exclusive-OR function of FIG. 2 into a different coordinate space illustrating a solution based on implementations of the subject matter of this disclosure;

DETAILED DESCRIPTION

Figure 1:
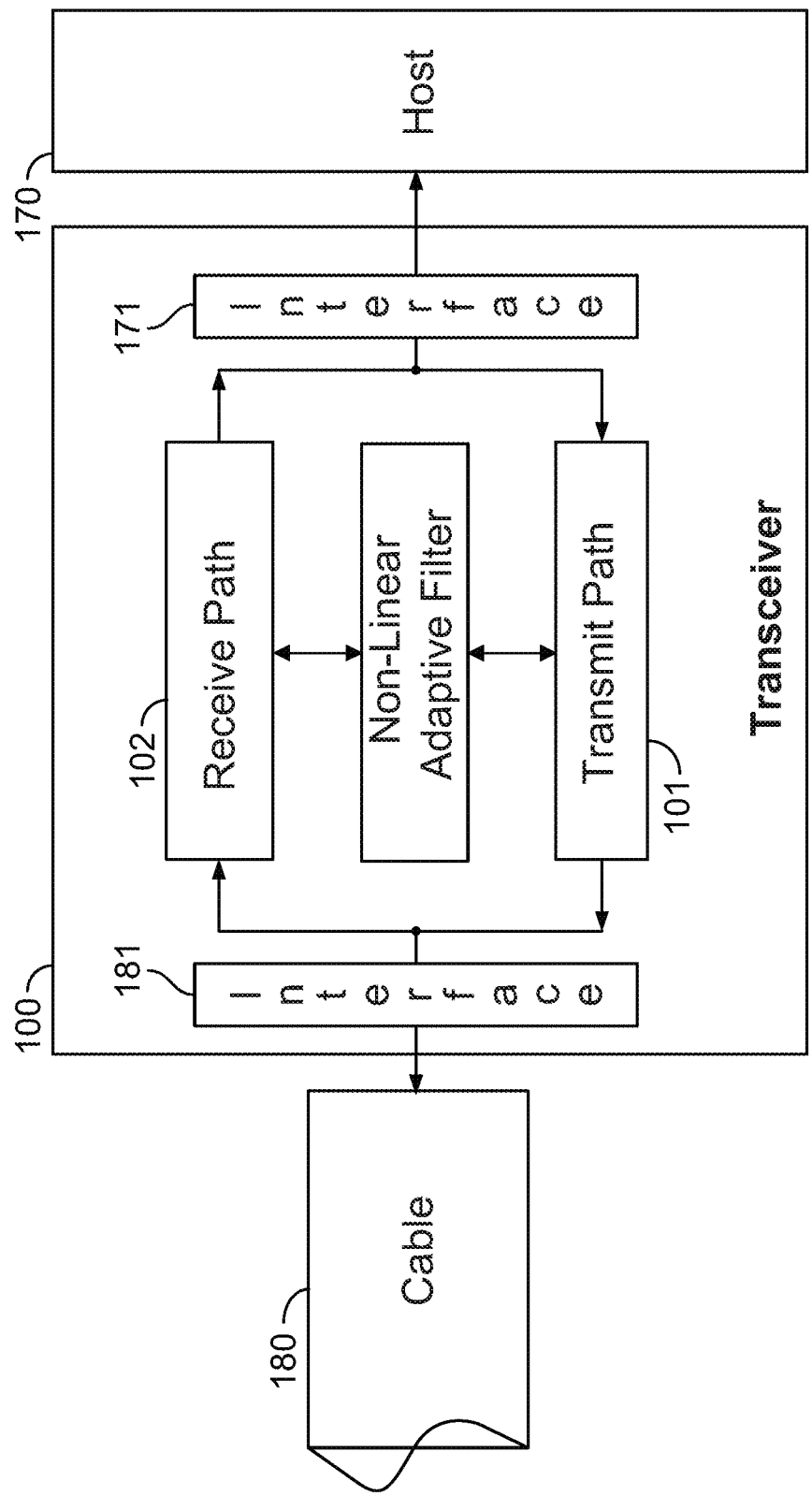
FIG. 1 is a representation of a physical layer transceiver that may incorporate implementations of the subject matter of this disclosure.

As noted above, integrated circuit devices may include high-speed SERDES links between various device components. Typical SERDES links may suffer from significant non-linearity or channel impairment in the signal path, as a result of, e.g., insertion loss, inter-symbol-interference (ISI), and, in an optical system, non-linearities such as dispersion loss or, in a copper (i.e., wireline) system, cross-talk, jitter, etc. Various forms of linear equalization typically are used, at the receiver end of such links, to attempt to deal with such channel impairments.

However, particularly in an Ethernet physical layer transceiver (PHY), linear equalization may not be sufficient to compensate for such non-linearities, because the signal levels (e.g., voltage levels) to be distinguished in a data signal may be close together. For example, as opposed to typical non-return-to-zero (NRZ) signaling, which uses two levels to represent '0' and '1', a SERDES in an SoC device may use 4-level pulse-amplitude modulation (PAM4) signaling having four voltage levels, but with the same maximum voltage swing as NRZ signaling, to represent four possible two-bit symbols ('00', '01', '10', '11'). Moreover, Ethernet signaling may use an even higher modulation, such as 8-level pulse-amplitude modulation (PAM8) or 16-level pulse-amplitude modulation (PAM16) or higher. Thus, rather than one threshold within that voltage range dividing between two signal levels, there could be fifteen (or more) thresholds within the voltage range, dividing among as many as sixteen (or more) signal levels. Linear equalization may not be sufficient to correctly assign received samples near the thresholds between levels to the correct transmitted bit or symbol when the thresholds are close together and the signal-to-noise ratio is low.

Moreover, in Ethernet-type signaling, there may be many signal sources on the channel contributing to various forms different of interference—particularly echoes, near-end crosstalk and far-end crosstalk.

In accordance with implementations of the subject matter of this disclosure, non-linear equalization is used to compensate for non-linearities in the PHY channel, as well as to cancel echoes, to cancel near-end crosstalk, and to cancel far-end crosstalk, thereby reducing the bit-error rate (BER). In different implementations, different types of non-linear equalizers may be used.

Conceptually, a linear equalizer performs the separation of samples for assignment to one level or another by effectively drawing a straight line between groups of samples plotted in a two-dimensional (e.g., (x, y)) space. In channels that are insufficiently linear, or where the levels are too close together, there may not be a straight line that can be drawn between samples from different levels on such a plot. A non-linear equalizer effectively re-maps the samples into a different, non-linear (e.g., radial or polar) space in which the samples from different levels may be separated by a straight line or other smooth curve.

A non-linear equalizer in accordance with implementations of the subject matter of this disclosure may be more or less complex. For example, a non-linear equalizer may have more or fewer variables, or taps, with complexity being proportional to the number of variables. In addition, a non-linear equalizer that operates at the bit level—i.e., operates separately on the bits of each symbol (e.g., two bits/symbol for PAM4 signaling) rather than on the symbol as a whole—may be less complex than a non-linear equalizer that operates at the symbol level. Either way, greater complexity yields greater performance when all other considerations are equal. However, greater complexity also may require greater device area and/or power consumption.

Types of non-linear equalizers that may be used in accordance with the subject matter of this disclosure may include multi-layer perceptron neural network (MLPNN) equalizers, and reduced-complexity multi-layer perceptron neural network (RC-MLPNN) equalizers, as well as radial-basis function neural network (RBFNN) equalizers, and reduced-complexity radial-basis function neural network (RC-RBFNN) equalizers, as described in more detail below.

Performance of the non-linear equalizer may be affected by the cost function used for adaptation of the equalizer. For example, according to implementations of the subject matter of this disclosure, the non-linear equalizer may use one of various different cost functions for adaptation, including either a minimum mean-square error (MMSE or MSE) cost function, or a cross-entropy (CE)-based cost function. A CE-based cost function may yield a better result than an MMSE cost function, but a CE-based cost function is more complex than an MMSE cost function.

Therefore, according to implementations of the subject matter of this disclosure, the choice of which form of non-linear equalizer to use, and of which cost function to use, may be a tradeoff of complexity (and therefore expense) versus performance.

The subject matter of this disclosure may be better understood by reference to FIGS. 1-21.

FIG. 1 illustrates the structure of a physical layer transceiver 100 that may incorporate implementations of the subject matter of this disclosure, in the context of a communications channel such as an Ethernet network channel. Physical layer transceiver 100 may include a transmitter path/channel 101, and a receiver path/channel 102, for data flowing between a host device 170 and wireline channel medium (e.g., cable) 180. A host interface 171 couples transmitter path/channel 101 and receiver path/channel 102 to host device 170, while a medium-dependent interface (MDI) 181 couples transmitter path/channel 101 and receiver path/channel 102 to channel medium 180.

Figure 2:
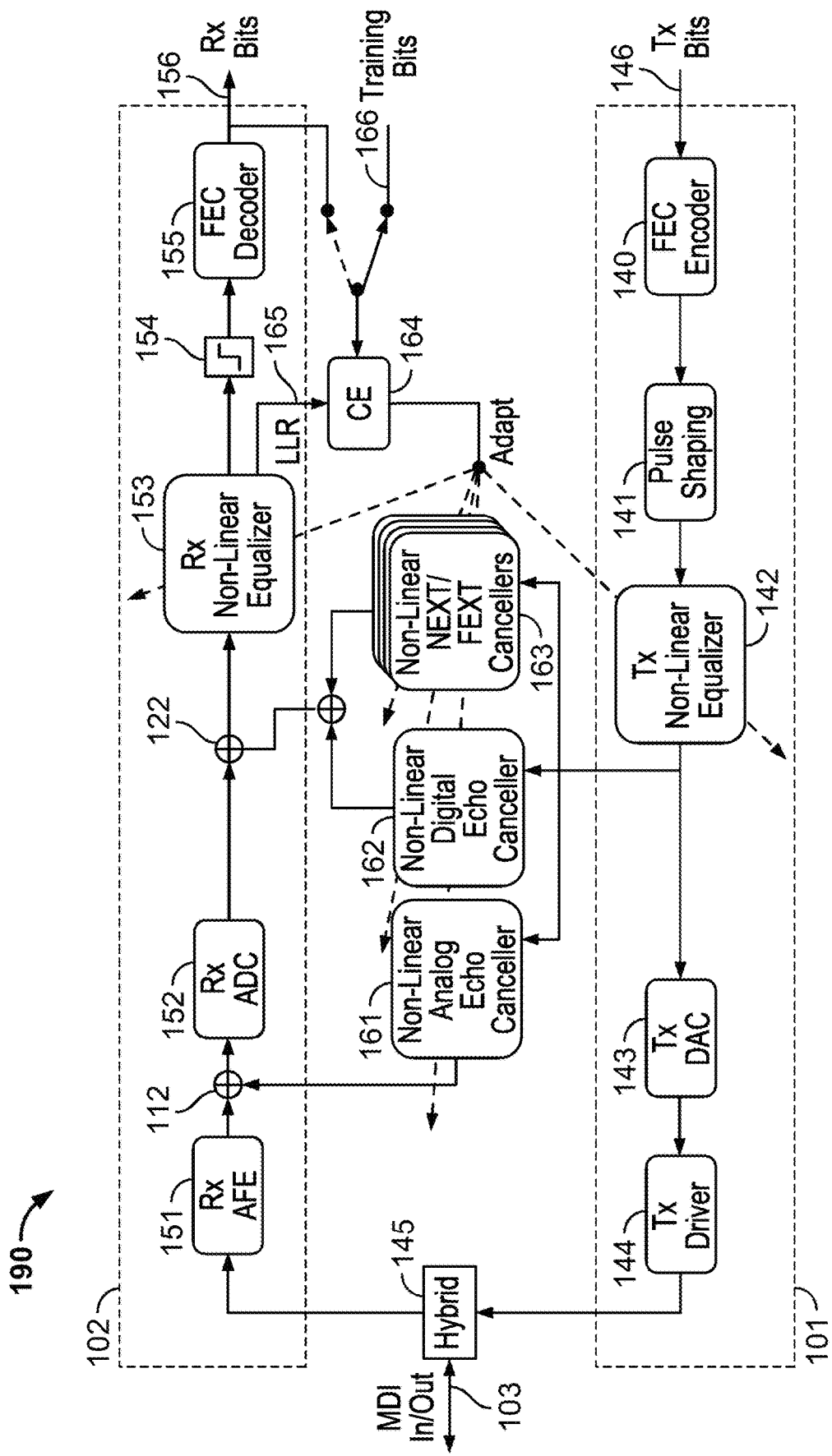
FIG. 2 is a representation of a particular implementation of a physical layer transceiver incorporating the subject matter of this disclosure.

FIG. 2 shows the details of a particular implementation 190 of a physical layer transceiver 100 in accordance with the subject matter of this disclosure. In the transmitter path/channel 101 of transceiver 190, an encoder 140—e.g., a forward-error correction (FEC) encoder—can be used to encode transmit data bits 146 desired to be transmitted, followed by a pulse-shaping circuit 141 to manipulate time-domain characteristics of the transmit waveform so that signal timing information can be easily extracted on the receiver side. A transmit equalizer 142 may be provided to subtract out undesired components, or to recapture signal components that spread to neighboring symbols, before transmission. The equalized output is converted from digital to analog for transmission by transmit digital-to-analog converter 143, and then driven onto channel medium 103 by transmit driver 144 via hybrid coupler and transformer 145 (serving as the MDI 181).

In the receiver path/channel 102 of transceiver 190, data may be received from the channel medium 180 at the hybrid coupler and transformer 145, and sent to an analog front end 151 of receiver 102, and then to an analog-to-digital converter (ADC) 152. An equalizer 153 can include one or more equalizers to remove interference. The output of the equalizer block 153 is sliced at slicer 154 and provided to a decoder 155—e.g., a forward-error correction (FEC) decoder—which outputs received data bits 156.

An analog echo canceller 161 may be provided between transmit path 101 and the analog domain of receive path 102 at 112. A digital echo canceller 162 may be provided between transmit path 101 and the digital domain of receive path 102 at 122. Crosstalk cancellers 163, which may filter near-end crosstalk, far-end crosstalk or both, also may be provided between transmit path 101 and the digital domain of receive path 102 at 122.

In accordance with implementations of the subject matter of this disclosure, any one or more of transmit equalizer 142, receiver equalizer 153, analog echo canceller 161, digital echo canceller 162, and crosstalk cancellers 163, may be based on non-linear filters, and particularly on non-linear neural network filters. Suitable non-linear neural network filters are described in copending, commonly-assigned U.S. patent application Ser. No. 17/248,658, filed Feb. 2, 2021 and copending, commonly-assigned U.S. patent application Ser. No. 17/648,831, filed Patent Application No. concurrently herewith, each of which is hereby incorporated herein by reference in its respective entirely.

An adaptation function 164 may compare log-likelihood ratios 165 output by equalizer 153 to output data bits 156 or, during a training mode, to training bits 166, to adapt the various non-linear equalizers 142, 153, 161, 162, 163.

The purpose of implementing equalization on the channel is to correct for various sources of interference referred to above and thereby effectively move samples that are on the wrong side of the threshold to the correct side of the threshold. Linear equalization effectively takes a plot of the samples in a two-dimensional (x, y) space and draws a straight line between the samples to indicate where the threshold ought to be. However, in a channel with non-linearities, there may be no straight line that can be drawn on that two-dimensional plot that would correctly separate the samples. In such a case, non-linear equalization can be used. Non-linear equalization may effectively remap the samples into a different space (e.g., having a different scale or coordinate system) in which there does exist a straight line that correctly separates the samples.

Alternatively, the non-linear equalization function may remap the samples into a space in which there exists some smooth curve other than a straight line that correctly separates the samples. For example, the non-linear equalization function may remap the samples into a polar-coordinate or radial space in which the samples are grouped into circular or annular bands that can be separated by circles or ellipses.

The advantage of non-linear equalization over linear equalization in a non-linear channel may be seen in a simplified illustration as shown in FIGS. 3 and 4, where the signal to be equalized is characterized by the exclusive-OR (XOR or CI) function. FIG. 3 is plot of y=$x_1 \oplus x_2$ in ($x_1$, $x_2$) space, where the open dots 201, 202 represent y=0 and cross-hatched dots 203, 204 represent y=1. It is apparent that there is no straight line that can be drawn separating the open dots from the cross-hatched dots.

However, a radial basis function $$\varphi(r_i) = \varphi(\|x - c_i\|) = e^{-\left\|\begin{bmatrix}x_1\\x_2\end{bmatrix} - c_i\right\|^2}$$

can be used to transform the XOR function from the linear Cartesian ($x_1$, $x_2$) space to a non-linear radial ($\varphi(r_1)$, $\varphi(r_2)$) space as follows:

| $x_1$ | $x_2$ | $\varphi(r_1)$ | $\varphi(r_2)$ | y |
|---|---|---|---|---|
| 0 | 0 | 0.1353 | 1 | 0 |
| 0 | 1 | 0.3678 | 0.3678 | 1 |
| 1 | 0 | 0.3678 | 0.3678 | 1 |
| 1 | 1 | 1 | 0.1353 | 0 | which is diagrammed in FIG. 4. As can be seen, when mapped into the non-linear radial ($\varphi(r_1)$, ($\varphi(r_2)$) space, the values 301, 302, 303 (as can be seen, both of the two y=1 points 201, 202 in ($x_1$, $x_2$) space map to the same point 301 in ($\varphi(r_1)$, $\varphi(r_2)$) space) of the XOR function 300 may be separated by straight line 304.

As discussed below, various types of non-linear equalizers are available. Whatever type of non-linear equalizer is used may be adaptive to account for changing channel conditions. Various forms of cost function may be used for adaptation, to reduce errors on subsequent iterations.

One type of adaptation function that may be used is minimum mean-squared error (MMSE), where the mean-squared error (MSE) is defined as the square of the norm of the difference between the equalized signal (Y) and the ideal signal ($\hat{Y}$). The equalizer may initially be adapted in a training mode in which the ideal signal values are available. Later, during run-time operation, the detected output values of the equalized channel should be close enough to the ideal values to be used for adaptation.

Another type of adaptation function that may be used is the cross-entropy (CE) between a training bit and its log-likelihood ratio (LLR). In particular, cost function circuitry may be configured to compute a cross-entropy value indicative of a difference between a probability distribution of the detected bit value (which is a function of the LLR signal) and a probability distribution of the training bit value. The cost function circuitry then adapts the equalizer by setting an equalizer parameter (e.g., one or more coefficients of filter taps of the equalizer) to a value that corresponds to a minimum cross-entropy value from among the computed cross-entropy values and one or more previously computed cross-entropy values, to decrease a bit-error rate for the channel. As in the case of MSE equalization, the equalizer may initially be adapted in a training mode in which the ideal signal values are available. Later, during run-time operation, the detected output values of the equalized channel should be close enough to the ideal values to be used for adaptation. Specifically, if any forward error correction code (FEC) decoder (e.g., a Reed Solomon (RS) decoder or Low-Density Parity Check (LDPC) decoder) is available after the equalizer, then successfully decoded frames from the FEC decoder output may be used for adaptation.

LLR may be defined as the relationship between the probability ($P_0$) of a bit being '0' and the probability ($P_1$) of a bit being '1':

$$LLR = L = \log\left(\frac{P_1}{P_0}\right)$$

$$P_1 + P_0 = 1$$

$$P_0 = \frac{1}{(1 + e^L)}$$

$$P_1 = \frac{e^L}{(1 + e^L)}$$

The cross-entropy between a training bit and its LLR may be computed as follows:

$$\text{Cross Entropy}(bit, LLR) = -P(bit = 0) \cdot \log(P_0) - P(bit = 1) \cdot \log(P_1)$$

$$\text{Cross Entropy}(bit, LLR) = -(1 - bit) \cdot \log(P_0) - bit \cdot \log(P_1)$$

$$\text{Cross Entropy} = Inf \text{ when } \begin{cases} bit = 0, & P_0 = 0 \\ bit = 1, & P_1 = 0 \end{cases}$$

-continued $$\text{Cross Entropy} = 0 \text{ when } \begin{cases} \text{bit} = 0, & P_0 = 1 \\ \text{bit} = 1, & P_1 = 1 \end{cases}$$

When the true bit is a logic '0' but the probability of the detected bit represented by the LLR indicates that $P_0=0$, or the true bit is a logic '1' but the probability of the detected bit represented by the LLR indicates that $P_1=0$, then the true value is the complete opposite of the expected value, meaning that cost (cross-entropy) approaches infinity. On the other hand, when the probability of a detected bit value as indicated by the LLR agrees with the true bit value, then cross-entropy equals zero. Insofar as in most cases both probabilities $P_0$ and $P_1$ are higher than 0 and lower than 1, cross-entropy will be a finite non-zero value. Thus, this cost function can be used for adaptation and reflects the quality of the detected bits, with the goal being to minimize cross-entropy.

The gradient of cross-entropy with respect to the LLR may be computed by substituting for $P_0$ and $P_1$ in the cross-entropy equation:

$$\frac{\partial(CE)}{\partial(LLR)} = P_1 - \text{bit} = \begin{cases} P_1 & \text{when bit} = 0 \\ P_1 - 1 = -P_0 & \text{when bit} = 1 \end{cases}$$

The LLR may be adapted to minimize cross-entropy (i.e., $$\frac{\partial(CE)}{\partial(LLR)} = 0),$$

as follows:

$LLR_{t+i} = LLR_t - \alpha \cdot P_1$ if bit=0

$LLR_{t+i} = LLR_t + \alpha \cdot P_0$ if bit=1

A negative LLR means bit=0 has a higher probability than bit=1, while a positive LLR means bit=1 has a higher probability than bit=0. In these equations, $P_0$ and $P_1$ are probabilities and therefore are positive values, and $\alpha$ is an adaptation bandwidth which also is positive. Therefore, when the true bit=0 then adaptation using cross-entropy will make a negative LLR more negative, and when the true bit=1 then adaptation using cross-entropy will make a positive LLR more positive. Therefore, cross-entropy-based adaptation maximizes the magnitude of the LLR and hence is a maximum-likelihood adaptation which reduces BER. Thus, adaptation of the equalizer to minimize cross-entropy also minimizes BER.

If one assumes that there is a general computation graph from parameter X→Y→LLR→CE such that parameter X affects the value of output Y which affects the LLR, from which the cross-entropy may be computed, then the cross-entropy gradient can be expressed in terms of other parameters:

$$\frac{\partial(CE)}{\partial(parameter_X)} = \frac{\partial(parameter_Y)}{\partial(parameter_X)} \cdot \frac{\partial(LLR)}{\partial(parameter_Y)} \cdot \frac{\partial(CE)}{\partial(LLR)}$$

Therefore, any parameter can be adapted to minimize the cross-entropy.

Figure 5:
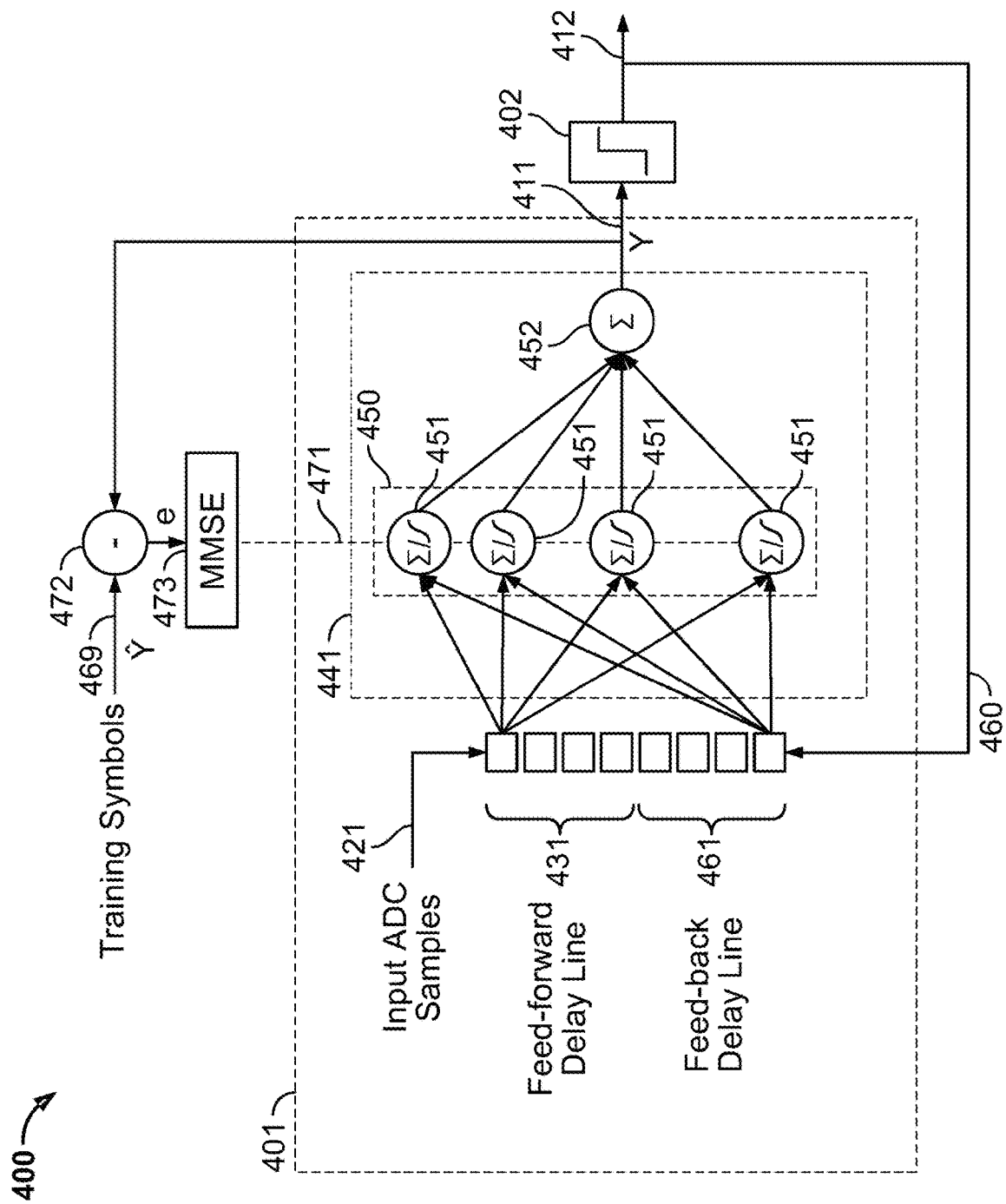
FIG. 5 is a diagram of a first implementation of a non-linear equalizer that may be used in accordance with the subject matter of this disclosure.
Figure 6:
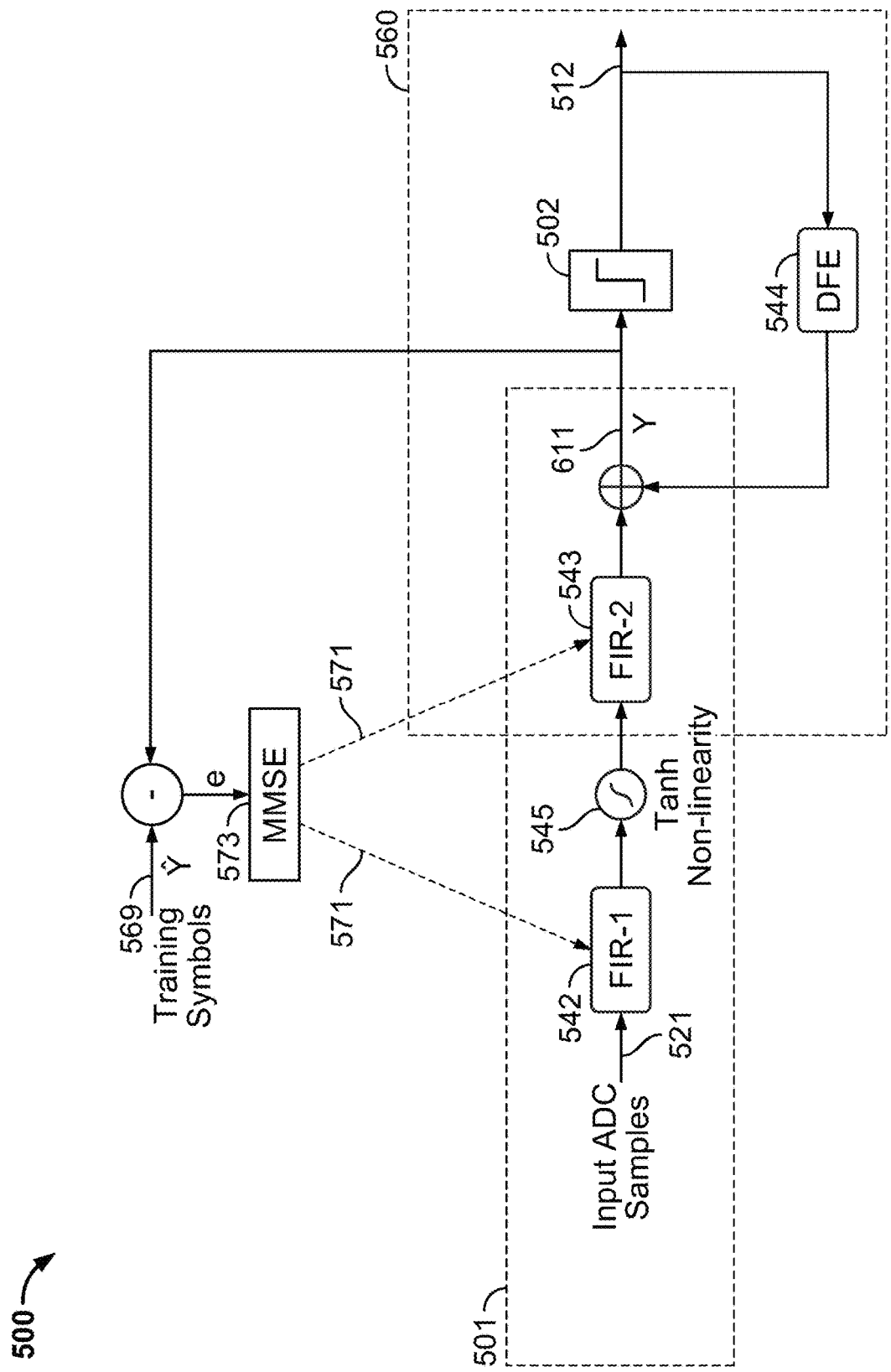
FIG. 6 is a diagram of a second implementation of a non-linear equalizer incorporating the subject matter of this disclosure.

One suitable implementation of a non-linear filter that may be used in accordance with the subject matter of this disclosure is non-linear equalizer 401, seen in FIG. 5. Non-linear equalizer 401 is a multi-layer perceptron neural network 402 providing an equalized signal (Y) 411 from input digitized samples 421 that are delayed at 431 and combined in multi-layer perceptron neural network 402.

As seen in FIG. 5, multi-layer perceptron neural network 441 includes at least one hidden layer 450 of hidden nodes 451. In this drawing only one hidden layer 450 is shown, but a multi-layer perceptron neural network equalizer in accordance with implementations of the subject matter of this disclosure may have multiple hidden layers (not shown). Similarly, while FIG. 5 shows four hidden nodes 451 in hidden layer 450, each hidden layer in a multi-layer perceptron neural network equalizer in accordance with implementations of the subject matter of this disclosure may have more or fewer hidden nodes 451, reflecting the number of parameters (filter tap coefficients).

Each hidden node 451 multiplies delayed samples 421 (to avoid crowding the drawing, only one of delays 431 is shown as being coupled to nodes 451; however, each delay 431 is coupled to nodes 451) by parameters (filter tap coefficients; not shown) and then sums (Σ) the filter taps. Each hidden node 451 then applies to its computed sum a non-linear activation function (e.g., a hyperbolic tangent activation function, tanh ($f$), although other non-linear activation functions may be used), to generate a node output, which is then passed to the next layer, and so on. The final layer 452 does not include a non-linear activation function but simply sums its inputs.

Hidden nodes 451 may receive inputs not only from feed-forward delays 431, but also from feed-back delays 461, representing samples 460 of a fed-back prior symbol decision 412 of slicer 402, which may be helpful in mitigating inter-symbol interference.

The aforementioned parameters of non-linear equalizer 401 are adapted based on the output Y. One approach for adapting the parameters of non-linear equalizer 401 is to compute at 472 the error (e) with respect to an ideal sample Ŷ derived from training symbols 469. Minimization of the mean square error at 473 may then be used as the cost function to adapt the filter tap coefficients at nodes 451 as indicated at 471.

As an alternative to multi-layer perceptron neural network 401, an implementation 500 (FIG. 6) according to the subject matter of this disclosure may include a reduced-complexity multi-layer perceptron neural network 501 operating on input digitized samples 521. Reduced-complexity multi-layer perceptron neural network 501 includes two feed-forward filters 542, 543, which may, e.g., be finite-impulse-response (FIR) filters. A slicer 502 provides an output decision Y 512 that is fed back through decision-feedback equalizer (DFE) 544 and combined with the output of second feed-forward (e.g., FIR) filter 543 to mitigate inter-symbol interference from a previous symbol. Reduced-complexity multi-layer perceptron neural network 501 resembles a linear-equalizer 560 (including FIR filter 543 and decision-feedback equalizer 544), having as its input the output of an additional feed-forward filter 542 to which a non-linear activation function 545 (e.g., a hyperbolic tangent activation function, tanh ($f$), although other non-linear activation functions may be used) has been applied.

Similarly to the case of non-linear equalizer 401, the parameters of non-linear equalizer 501 are adapted based on the output Y. One approach for adapting the parameters of non-linear equalizer 501 is to compute the error (e) with respect to an ideal sample Ŷ derived from training symbols 569. Minimization of the mean square error at 573 is then used as the cost function to adapt the filter tap coefficients of FIR filters 542, 543 as indicated at 571.

However, as described above, cross-entropy may serve as a more effective cost function for adapting the parameters of a non-linear equalizer to minimize BER.

Figure 7:
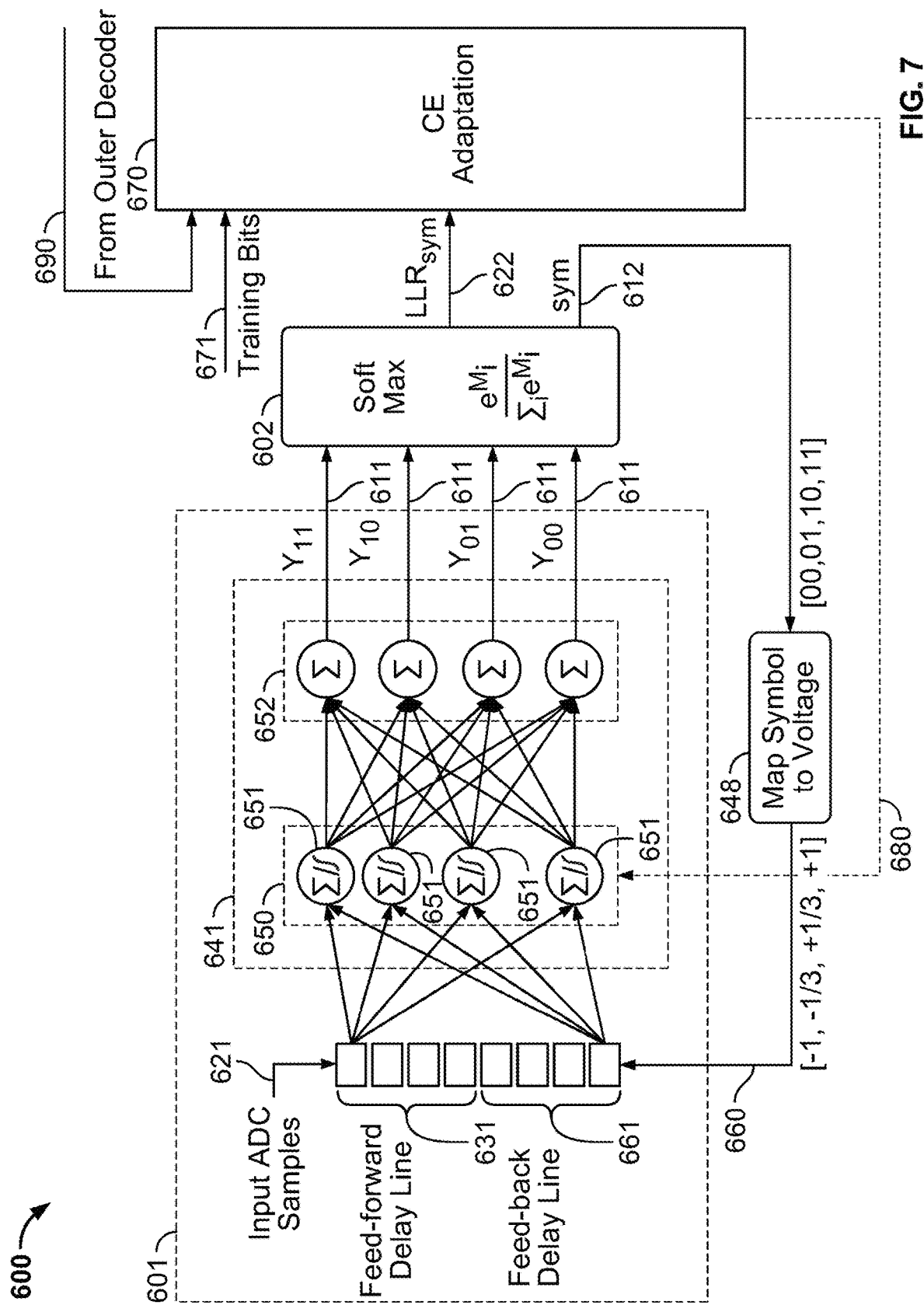
FIG. 7 is a diagram of a third implementation of a non-linear equalizer incorporating the subject matter of this disclosure.

FIG. 7 shows an implementation 600 of a non-linear equalizer according to the subject matter of this disclosure. Non-linear equalizer 601 is a multi-layer perceptron neural network 641 providing four separate equalized signals ($Y_{ij}$; i=0, 1; j=0, 1) 611 from input digitized samples 621 that are delayed at 631 and combined in multi-layer perceptron neural network 641. A softmax function:

$$\frac{e^{M_i}}{\sum_i e^{M_i}}$$

implemented in circuitry 602 provides an output decision (sym) 612, which is fed back (after conversion at 648 to a voltage—e.g., −1 for '00', −⅓ for '01', +⅓ for '10' and +1 for '11', in the case of a 4-level signaling system such as PAM4) to multi-layer perceptron neural network 641 to mitigate inter-symbol interference from a previous symbol, and an output log-likelihood ratio ($LLR_{sym}$) 622.

As in the case of FIG. 5, multi-layer perceptron neural network 641 includes at least one hidden layer 650 of hidden nodes 651. In this drawing only one hidden layer 650 is shown but a multi-layer perceptron neural network equalizer in accordance with implementations of the subject matter of this disclosure may have multiple hidden layers (not shown). Similarly, while FIG. 7 shows four hidden nodes 651 in hidden layer 650, each hidden layer in a multi-layer perceptron neural network equalizer in accordance with implementations of the subject matter of this disclosure may have more or fewer hidden nodes 651, reflecting the number of parameters (filter tap coefficients).

Each hidden node 651 multiplies delayed samples (to avoid crowding the drawing, only one of delays 631 is shown as being coupled to nodes 651; however, each delay 631 is coupled to nodes 651) by parameters (filter tap coefficients; not shown) and then sums ($\Sigma$) the filter taps. Each hidden node 651 then applies to its computed sum a non-linear activation function (e.g., a hyperbolic tangent activation function, tanh ($f$), although other non-linear activation functions may be used), to generate a node output, which is then passed to the next layer, and so on. The final layer 652 does not have non-linear activation function but simply sums its inputs separately for each of the four symbols.

Hidden nodes 651 receive inputs not only from feed-forward delays 631, but also from feed-back delays 661, representing samples of a fed-back prior symbol decision 660, for mitigating inter-symbol interference.

Because equalizer 601 provides soft output in the form of an LLR, the output may be used with a further outer decoder (not shown), which may be a forward error-correcting (FEC) decoder such as a low-density parity check (LDPC) decoder or a Reed-Solomon decoder.

The aforementioned parameters of non-linear equalizer 601 may be adapted to minimize cross-entropy, using cross-entropy adaptation circuitry 670, between a training symbol ($\widetilde{sym}$) that is obtained by grouping training bits 671, and output log-likelihood ratio ($LLRs_{sym}$) 622. Cross-entropy adaptation circuitry 670 is able to adjust parameters of non-linear equalizer 601, at 680, to minimize the cross-entropy between the training symbol ($\widetilde{sym}$) and the probability of the detected symbol which is represented by $LLR_{sym}$ 622. During run-time, output bits 690 of an outer decoder (such as a Forward Error Correcting, or FEC, decoder; not shown), but only from successfully decoded frames, may be used in place of training bits 671.

Figure 8:
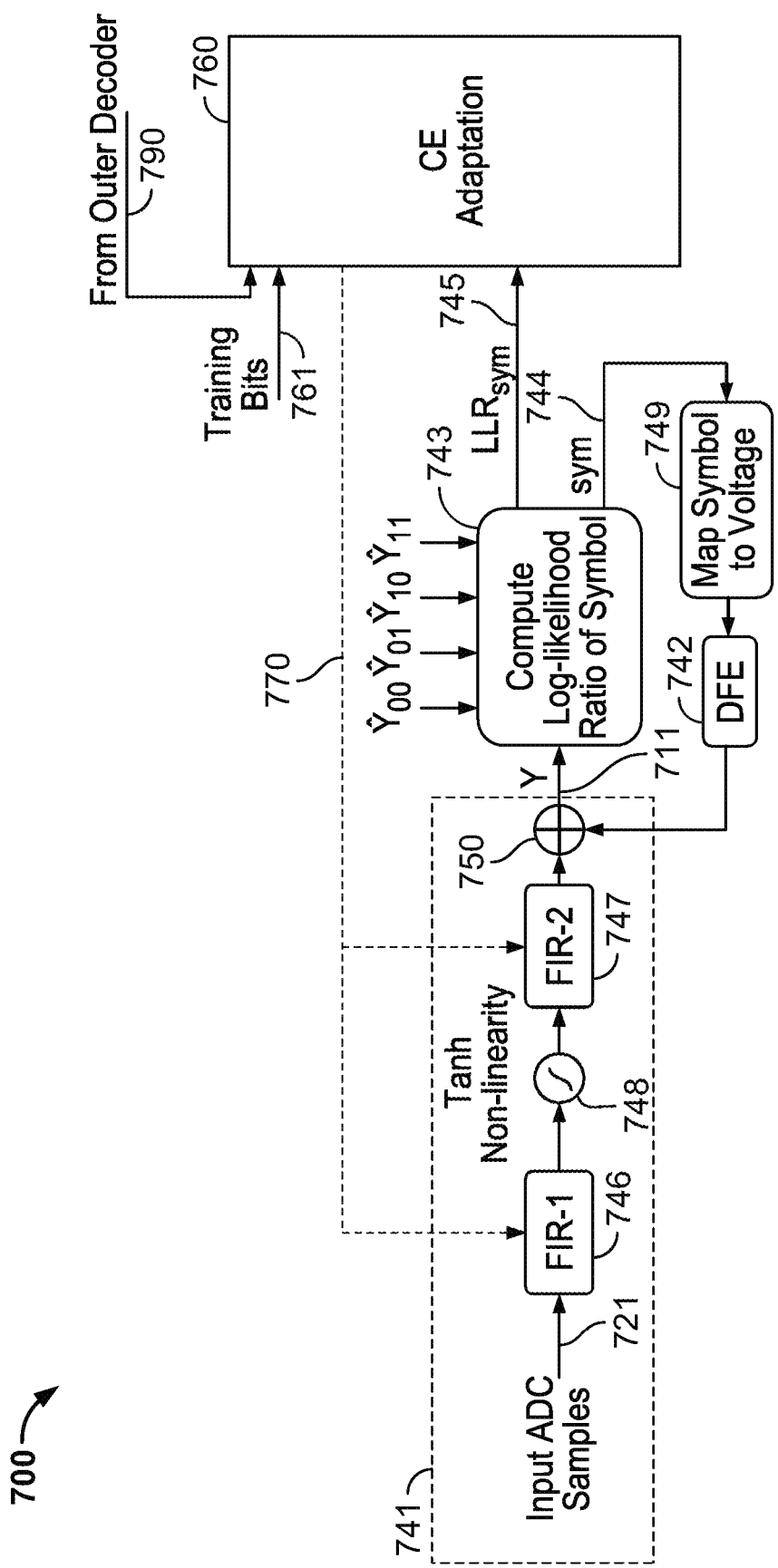
FIG. 8 is a diagram of a fourth implementation of a non-linear equalizer incorporating the subject matter of this disclosure.

FIG. 8 shows an implementation 700 according to the subject matter of this disclosure including a reduced-complexity multi-layer perceptron neural network 741, coupled with a decision-feedback equalizer 742, as well as log-likelihood ratio circuitry 743 that inputs an equalized signal (Y) 711 derived from input digitized samples 721, and outputs a symbol decision (sym) 744 and a log-likelihood ratio ($LLR_{sym}$) 745 of that symbol decision, based on target symbol values $\hat{Y}_{00}$, $\hat{Y}_{01}$, $\hat{Y}_{10}$, $\hat{Y}_{11}$.

Reduced-complexity multi-layer perceptron neural network 741 includes two feed-forward filters 746, 747, which may, e.g., be finite impulse response (FIR) filters. A non-linear activation function 748 (e.g., a hyperbolic tangent activation function, tanh ($f$), although other non-linear activation functions may be used) is applied to the output of feed-forward filter 746 which is then input to feed-forward filter 747. Symbol decision 744 is converted at 749 to a voltage for input to decision-feedback equalizer 742, the output of which is combined at 750 with the output of feed-forward filter 747 to mitigate inter-symbol interference from a previous symbol, to yield equalized signal (Y) 711.

The parameters of feed-forward filters 746, 747 may be adapted to minimize cross-entropy between output log-likelihood ratio ($LLR_{sym}$) 745 and "true" symbols obtained from true bits which may be training bits or, during run-time, the output of a further outer decoder (not shown). Cross-entropy adaptation circuitry 760 has, as an input, the output log-likelihood ratio ($LLR_{sym}$) 745. In a training mode, cross-entropy adaptation circuitry 760 also has as inputs known training bits 761, which serve as "true" bits which are then grouped to obtain true symbols. Cross-entropy adaptation circuitry 760 is able to adjust parameters of feed-forward filters 746, 747, at 770, by minimizing the cross-entropy between the training symbol obtained by grouping training bits ($\widetilde{sym}$) and the probability of the detected symbol which is represented by output log-likelihood ratio ($LLR_{sym}$) 745. At run-time, output bits 790 of an outer decoder (such as an FEC decoder; not shown), but only from successfully decoded frames, may be used in place of training bits 761.

Figure 9:
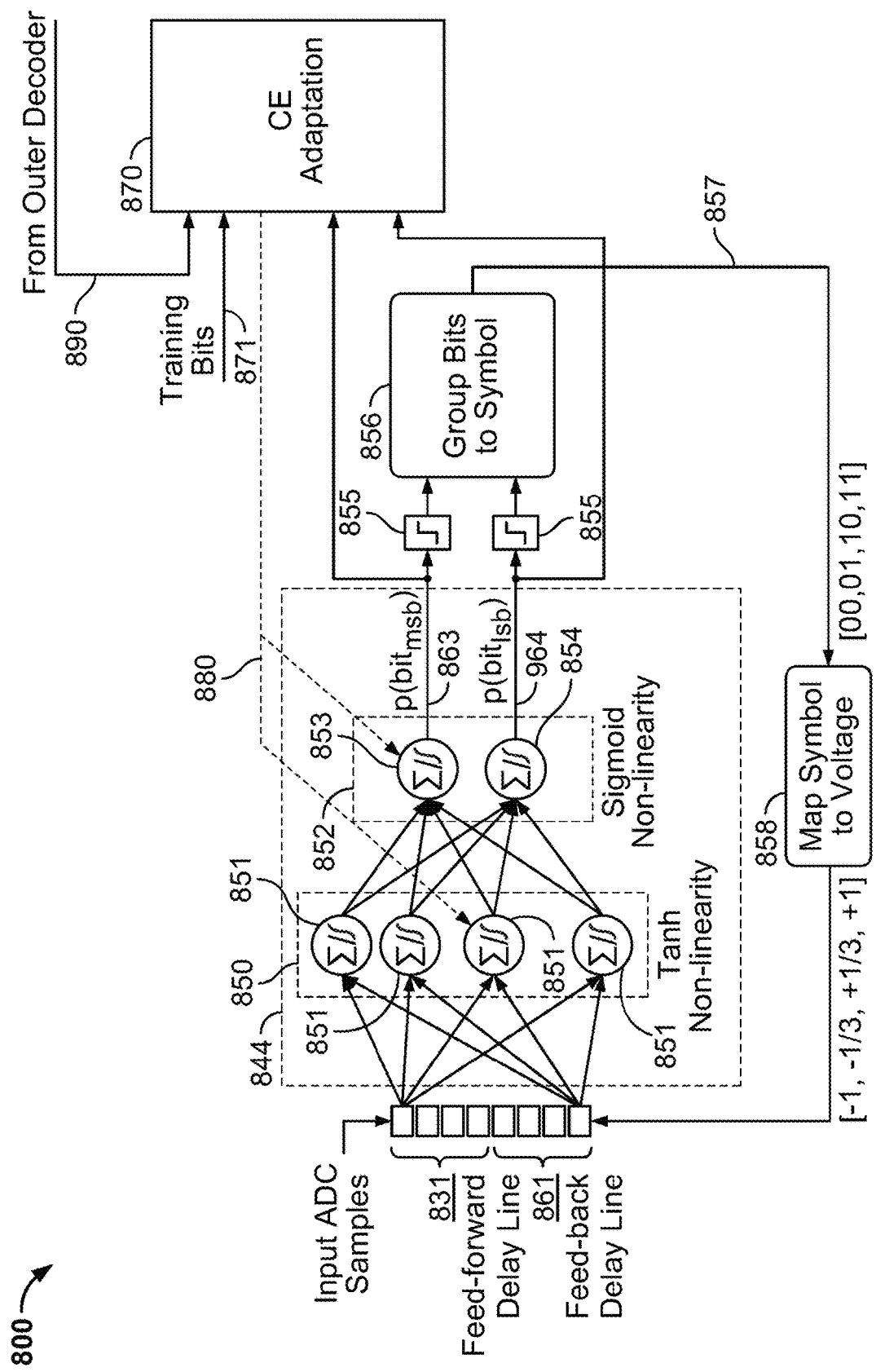
FIG. 9 is a diagram of a fifth implementation of a non-linear equalizer incorporating the subject matter of this disclosure.

Because a neural network equalizer is capable of decorrelating the bits of a multi-bit symbol, such as the two bits in a PAM4 symbol, a further implementation 800 according to the subject matter of this disclosure may be provided (FIG. 9). Implementation 800 includes an MLPNN equalizer 841 similar to MLPNN equalizer 541 in that it includes at least one hidden layer 850 of hidden nodes 851 in which samples delayed at 831 (to avoid crowding the drawing, only one of delays 831 is shown as being coupled to nodes 851; however, each delay 831 is coupled to nodes 851) are multiplied by parameters (filter tap coefficients; not shown) and then the filter taps are summed ($\Sigma$). Each hidden node 851 then applies to its computed sum a non-linear activation function (e.g., a hyperbolic tangent activation function, tanh ($f$), although other non-linear activation functions may be used), to generate a node output, which is then passed to the next layer, and so on.

MLPNN 841 differs from MLPNN 541 in that the final layer 852 includes two nodes 853, 854, in which the inputs are not merely summed as in layer 552 of MLPNN 541, but also have applied after summation a non-linear activation function, different from the non-linear activation function of nodes 851, that decorrelate the two bits of each symbol, with each node 853, 854 providing one of the two bits. The non-linear activation function of each node 853, 854 may be, instead of a hyperbolic tangent activation function, a sigmoid function having a profile similar to that of tanh (ƒ), but ranging from 0 to +1 rather than from −1 to +1.

Node 853 provides a probability estimate 863 (p(bit$_{msb}$)) for the most significant bit of the two bits in a symbol, and node 854 provides a probability estimate 864 (p(bit$_{lsb}$)) for the least significant bit of the two bits of the symbol. The two probability estimates 863, 864 are then compared in slicers 855 to a threshold value of 0.5 to a obtain bit estimate (e.g., bit=0 if p<0.5 and bit=1 if p≥0.5) for each bit in the symbol.

In an implementation in which the signaling includes more than four levels (e.g., PAM8 or PAM16), there would be more bits per symbol (e.g., 3 or 4 bits, respectively). In such a case, there would be a corresponding number of nodes rather than just two nodes 853, 854.

At 856, the separate bits are grouped back into a symbol, then fed back at 857 and converted to a corresponding voltage at 858 (e.g., −1 for '00', −⅓ for '01', +⅓ for '10' and +1 for '11', in a 4-level signaling system such as PAM4) for input to feed-back delays 861, representing samples of a fed-back prior symbol decision relative to the next inputs from feed-forward delays 831, for mitigating inter-symbol interference.

Because implementation 800 operates at the bit level rather than at the symbol level, cross-entropy adaptation circuitry 870 also operates at the bit level, determining the cross-entropy based on the separate bit-level probabilities 863, 864 and the training bits 871, or at run-time, the output 890 of an outer decoder (such as an FEC decoder; not shown).

At the bit level, cross-entropy may be determined by first determining the log-likelihood ratios from the probability estimates as described above. Starting with the most significant bit, where $P_0$ is p(bit$_{msb=0}$) and $P_1$ is p(bit$_{msb=1}$), LLR(bit$_{msb}$) can be computed. CE(bit$_{msb}$) can then be computed from LLR(bit$_{msb}$) and the most significant bit of the training bits or the outer decoder bits. Then using p(bit$_{lsb=0}$) as $P_0$ and p(bit$_{lsb=1}$) as $P_1$, LLR(bit$_{lsb}$) can be computed. CE(bit$_{lsb}$) can then be computed from LLR(bit$_{lsb}$) and the least significant bit of the training bits or the outer decoder bits. The bit level cross-entropy is the sum of CE(bit$_{msb}$)+CE(bit$_{lsb}$).

Figure 10:
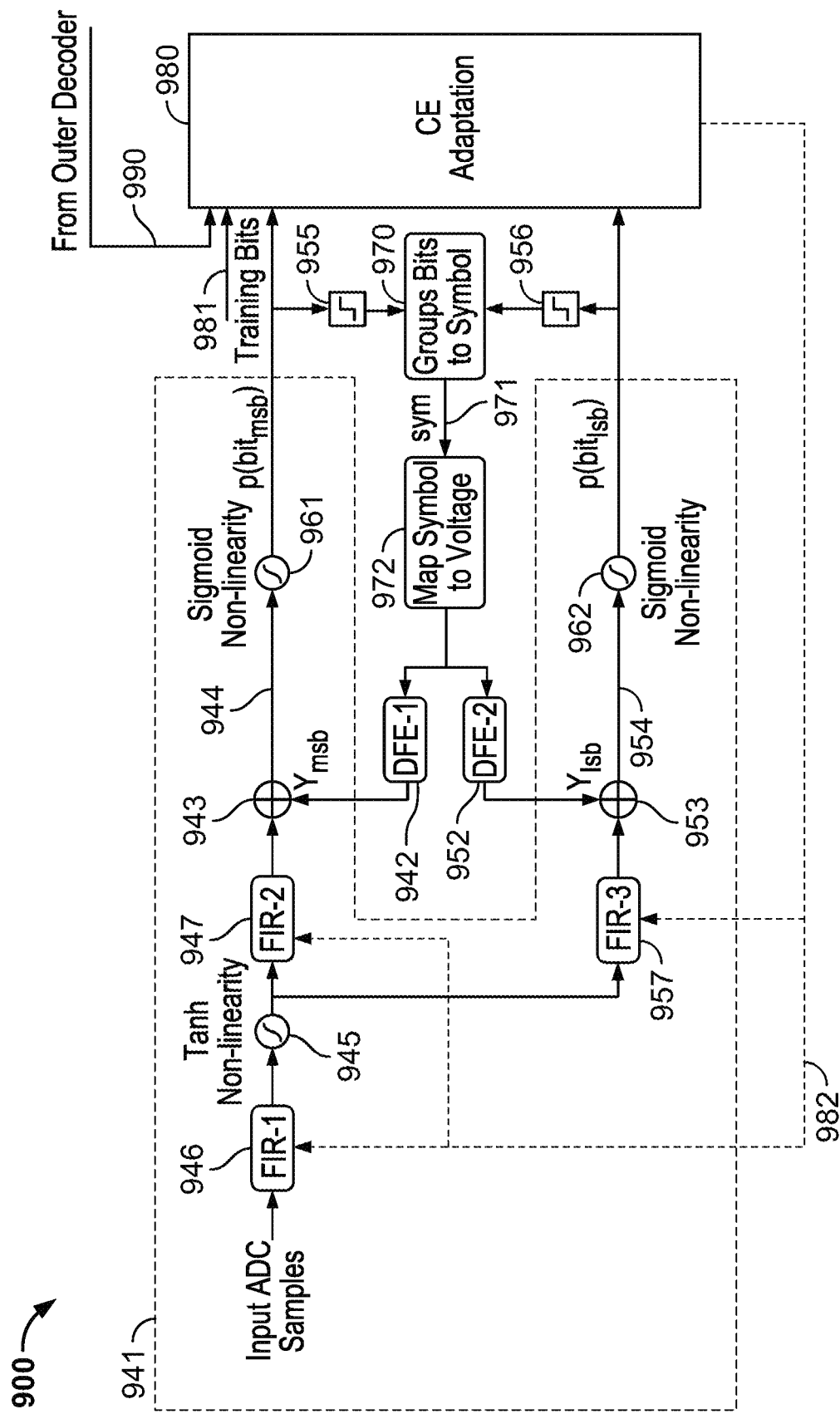
FIG. 10 is a diagram of a sixth implementation of a non-linear equalizer incorporating the subject matter of this disclosure.

FIG. 10 shows an implementation 900 according to the subject matter of this disclosure including a reduced-complexity multi-layer perceptron neural network 941 which can decorrelate the bits of a multi-bit symbol, such as the two bits in a PAM4 symbol, coupled with a respective decision-feedback equalizer 942, 952 for each respective bit.

Reduced-complexity multi-layer perceptron neural network 941 includes a first feed-forward filter 946, which may, e.g., be a finite impulse response (FIR) filter. A non-linear activation function 945 (e.g., a hyperbolic tangent activation function, tanh (ƒ), although other non-linear activation functions may be used) is applied to the output of feed-forward filter 946 which is then input to a second feed-forward filter 947, and in parallel to third feed-forward filter 957. Each of feed-forward filters 947, 957 produces a respective equalized bit output Y$_{msb}$ 944, and Y$_{lsb}$ 954.

A respective non-linear activation function 961, 962, different from non-linear activation function 945, is applied to each respective equalized bit output Y$_{msb}$ 944, and Y$_{lsb}$ 954. Non-linear activation functions 961, 962 may be, instead of a hyperbolic tangent activation function, a sigmoid function having a profile similar to that of tanh (ƒ), but ranging from 0 to +1 rather than from −1 to +1.

Non-linear activation function 961 provides a probability estimate p(bit$_{msb}$) for the most significant bit of the two bits in a symbol, and non-linear activation function 962 provides a probability estimate p(bit$_{lsb}$) for the least significant bit of the two bits of the symbol. Each of the two probability estimates is then compared in a respective slicers 955, 956 to a threshold value of 0.5 to a obtain bit estimate (e.g., bit=0 if p<0.5 and bit=1 if p≥0.5) for each bit in the symbol.

At 970, the two bits are grouped into a symbol 971, and then converted to a corresponding voltage at 972 (e.g., −1 for '00', −⅓ for '01', +⅓ for '9' and +1 for '11') for input to decision feed-back equalizer 942 in the most-significant-bit path, and to decision feed-back equalizer 952 in the least-significant-bit path. The output of each respective decision feed-back equalizer 942, 952 is combined at 943, 953, respectively, with the output of respective feed-forward filter 947, 957 to mitigate inter-symbol interference from a previous symbol, to yield the respective equalized bit outputs Y$_{msb}$ 944, and Y$_{lsb}$ 954 that are, as described above, input to non-linear activation functions 961, 962 to yield.

Cross-entropy may be determined, from p(bit$_{msb}$), p(bit$_{msb}$), and training bits 981 or outer decoder output 990, in cross-entropy adaptation circuitry 980 by, as in the case of implementation 800, first determining the log-likelihood ratios from the probability estimates as described above. Starting with the most significant bit, where $P_0$ is p(bit$_{msb=0}$) and $P_1$ is p(bit$_{msb=1}$), LLR(bit$_{msb}$) can be computed. CE(bit$_{msb}$) can then be computed from LLR(bit$_{msb}$) and the most significant bit of the training bits or the outer decoder bits. Then using p(bit$_{lsb=0}$) as $P_0$ and p(bit$_{lsb=1}$) and $P_1$, LLR(bit$_{lsb}$) can be computed. CE(bit$_{lsb}$) can then be computed from LLR(bit$_{lsb}$) and the least significant bit of the training bits or the outer decoder bits. The bit level cross-entropy is the sum of CE(bit$_{msb}$)+CE(bit$_{lsb}$).

A number of additional reduced-complexity implementations of non-linear neural network filters which may be used in accordance with the subject matter of this disclosure are illustrated in FIGS. 11-19.

Figure 11:
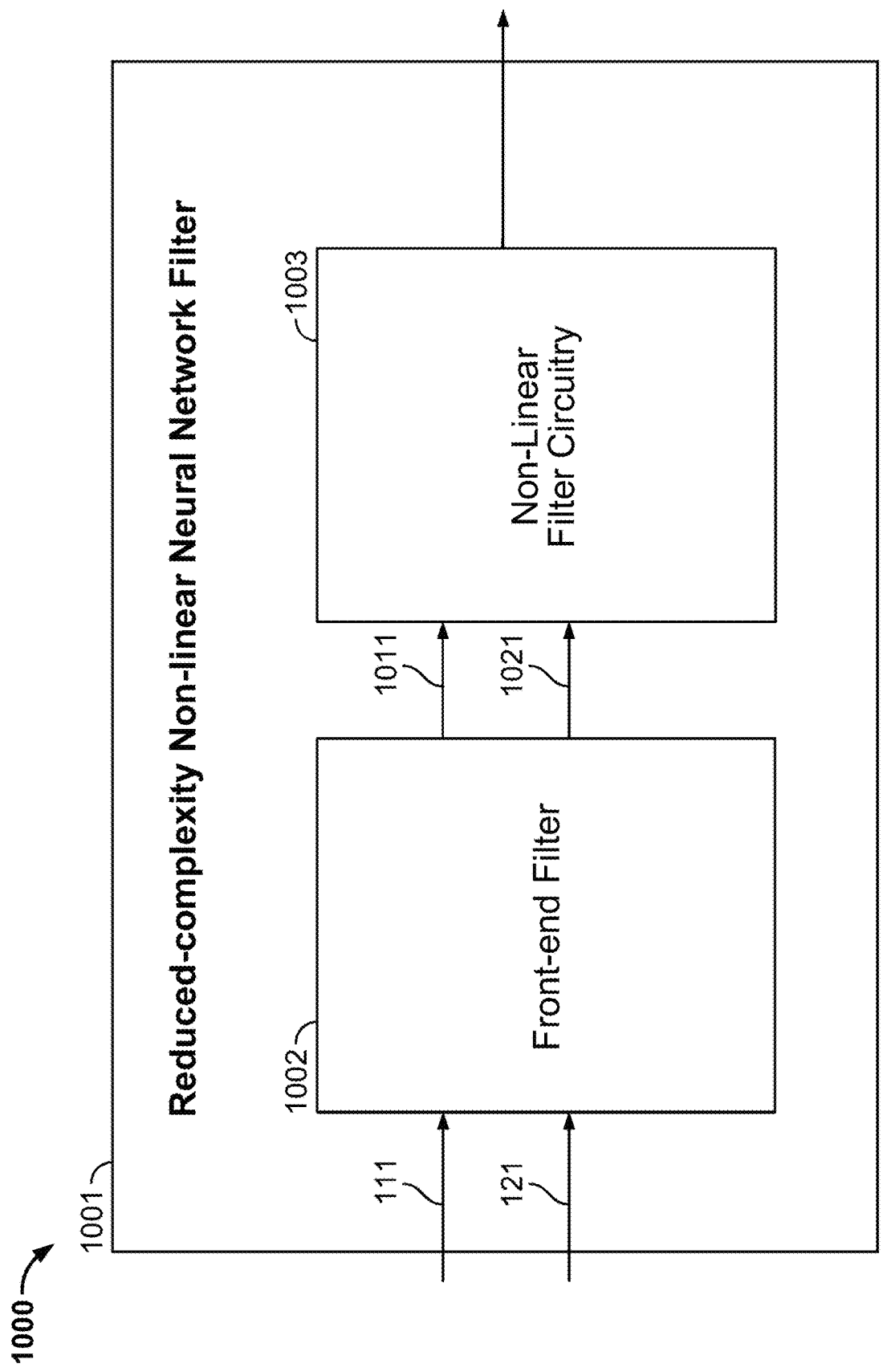
FIG. 11 shows a generic implementation of a class of reduced-complexity non-linear neural network filters in accordance with the subject matter of this disclosure.

FIG. 11 shows a general implementation 1000 of a reduced-complexity non-linear neural network filter 1001 in accordance with the subject matter of this disclosure for equalizing two sets of inputs 111, 121 from two signal sources on wireline medium 180 (as discussed below in connection with, e.g., FIG. 12, this is only an illustration, and there may be any number—i.e., one or more—sets of input signals). Reduced-complexity non-linear neural network filter 1001 accepts inputs 111, 121 of a certain complexity, but initially filters inputs 111, 121 through a front-end filter 1002 to reduce the complexity of inputs 111, 121, before filtering reduced-complexity inputs 1011, 1021 through non-linear filter circuitry 1003. Reduction of the complexity of inputs 1011, 1021 allows a reduction in the complexity (as measured by dimensionality) of non-linear filter circuitry 1003, therefore the complexity of non-linear neural network filter 1001, without having to reduce the complexity of the inputs 111, 121 being filtered.

Figure 12:
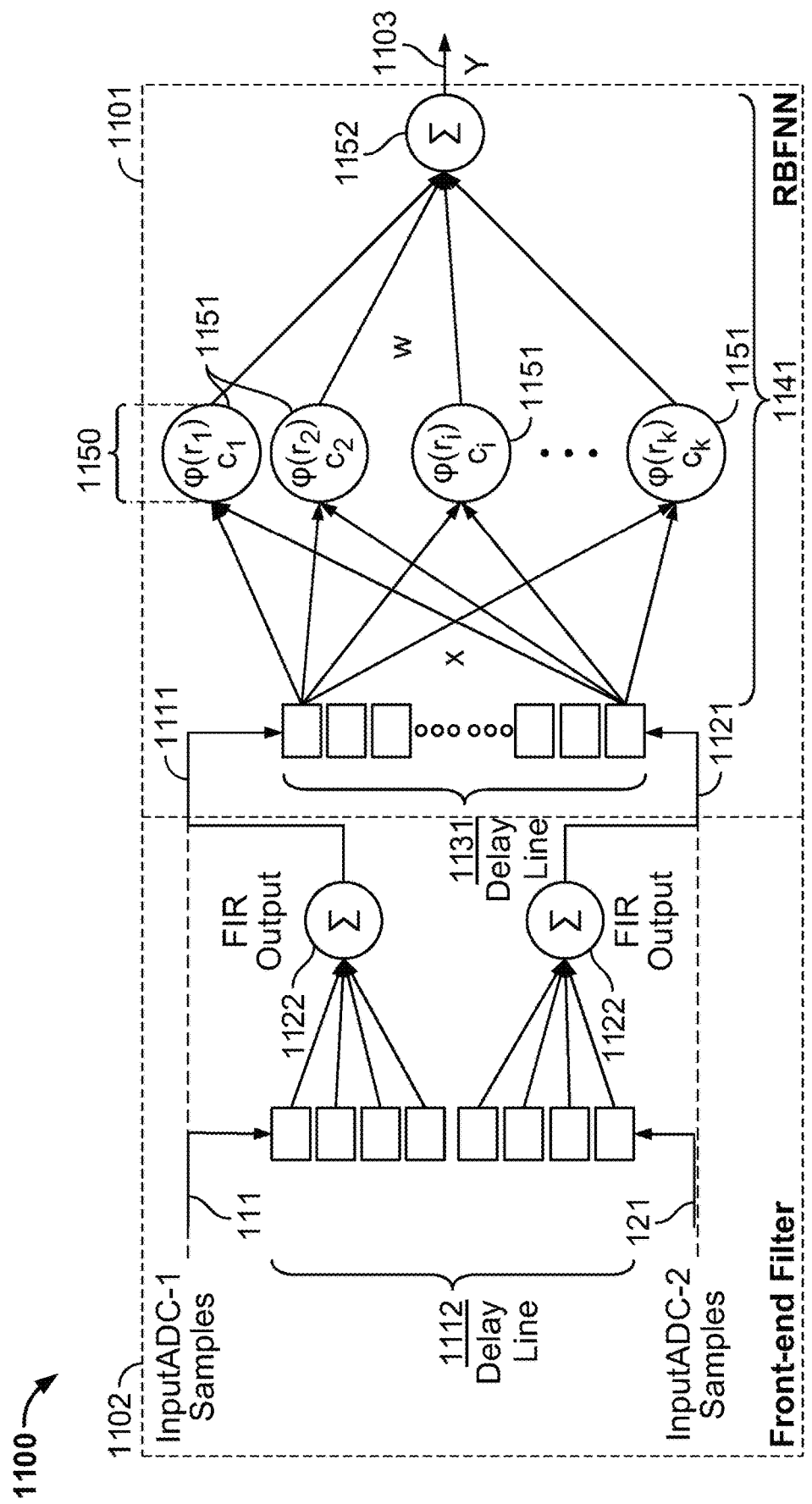
FIG. 12 is a diagram of a first implementation of a non-linear equalizer in the class of reduced-complexity non-linear neural network filters shown generically in FIG. 11.

A first implementation of a reduced-complexity non-linear neural network filter 1100, shown in FIG. 12, is based on a radial-basis function non-linear neural network filter 1101, with a finite-impulse-response-(FIR)-based front-end filter 1102.

In radial-basis function non-linear neural network filter 1101, digital samples from two inputs 1111, 1121 are delayed by delay line 1131 and combined in radial-basis function non-linear neural network 1141. As seen in FIG. 12, radial-basis function non-linear neural network 1141 includes at least one hidden layer 1150 of hidden nodes 1151. Each hidden node 1151 operates on each delayed sample with a radial-basis function, but to avoid crowding the drawing only some delays in delay line 1131 are shown as being coupled to each hidden node 1151. The outputs of hidden layer 1150 are combined (e.g., by addition) at 1152 to provide Y output 1103.

Each sample input at 1111, 1121 adds a parameter or dimension to radial-basis function non-linear neural network filter 1101, increasing filter complexity. In order to reduce the complexity of radial-basis function non-linear neural network filter 1101, reduced-complexity non-linear neural network filter 1100 includes front-end filter 1102, which combines some of the inputs from ADC outputs 111, 121 to provide a reduced number of inputs 1111, 1121 to radial-basis function non-linear neural network filter 1101. As can be seen in FIG. 12, in this implementation, front-end filter 1102 uses FIR filtering (each line connecting a delay 1112 to sum 1122 represents multiplication of a sample by a coefficient (not shown) forming a filter tap, with the taps being summed at 1122) to combine, e.g., every four input samples from ADC outputs 111, 121 into one input sample 1111, 1121, thereby allowing a reduction in the complexity (as measured by dimensionality) of radial-basis function non-linear neural network filter 1101, and therefore the complexity of non-linear neural network filter 1100, without having to reduce the complexity of the inputs 111, 121 being filtered. The unseen coefficients may be parameters that adapted with a back-propagation algorithm and, for example, may be derived from the equation set forth above in connection with the cross-entropy gradient In the implementation of FIG. 12, each set of input samples 111, 121 is processed in a separate portion of delay line 1112, and in a separate portion of delay line 1131. In this implementation, with two sets of input samples, each delay line is divided into two segments. However, more generally, the number of segments corresponds to the number of input sets. Thus, for a single input set, there would be only one segment (i.e., the delay line would not be segmented) but if there were three inputs sets, the delay line may be divided into three segments, etc.

Figure 13:
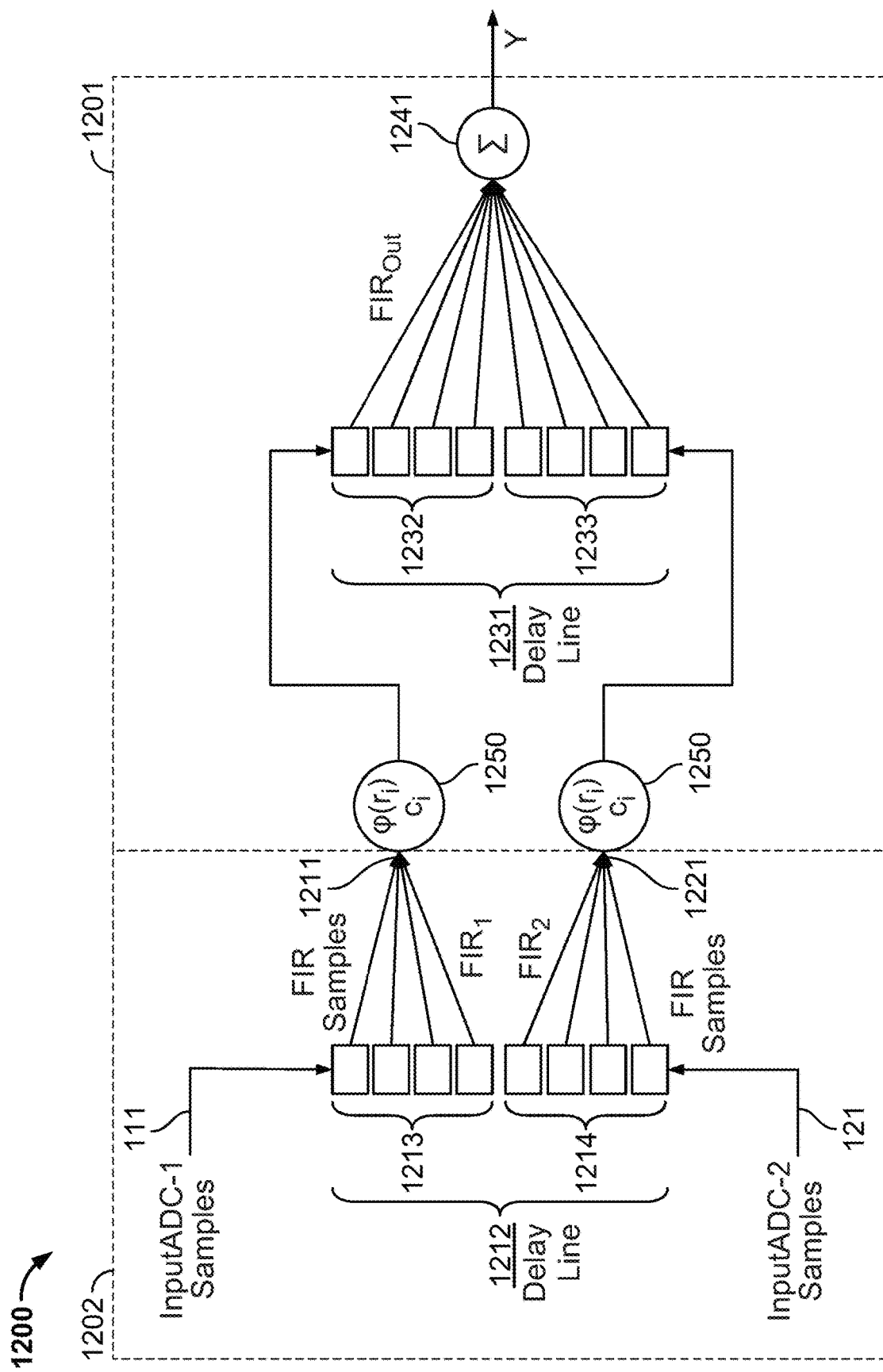
FIG. 13 is a diagram of a second implementation of a non-linear equalizer in the class of reduced-complexity non-linear neural network filters shown generically in FIG. 11.

A second implementation 1200 of a reduced-complexity non-linear neural network filter, shown in FIG. 13, also is based on a radial basis filter neural network filter 1201, with a finite-impulse-response-(FIR)-based front-end filter 1202. As in the case of front-end filter 1102, front-end filter 1202 uses FIR filtering (each line connecting a delay 1212 to radial-basis function 1250 represents multiplication of a sample by a coefficient (not shown; see discussion above in connection with FIG. 12) forming a filter tap) to combine, e.g., every four input samples from ADC outputs 111, 121 into one input sample 1211, 1221, thereby allowing a reduction in the complexity (as measured by dimensionality) of radial-basis function non-linear neural network filter 1201, therefore the complexity of non-linear neural network filter 1200, without having to reduce the complexity of the inputs 111, 121 being filtered.

However, in this implementation, rather than being summed, the taps of delay line 1212 are input directly to the hidden nodes 1250 of radial-basis function non-linear neural network filter stage 1201, which in this implementation are upstream of delay line 1231.

Once again, with inputs 111, 121 from two sources, half 1213 of delay line 1212 of front-end filter 1202 is devoted to input 111, while half 1214 of delay line 1212 of front-end filter 1202 is devoted to input 121, with one respective hidden node 1250 of radial-basis function non-linear neural network filter stage 1201 for each input source 111, 121. The same is true of delay line 1231 within radial-basis function non-linear neural network filter stage 1201, with separate halves 1232, 1233 of delay line 1231 devoted to inputs deriving separately from inputs 111, 121. Here too, the delays 1231 form individual taps of a final FIR filter, which are combined at summation node 1241 to yield the output Y.

Figure 14:
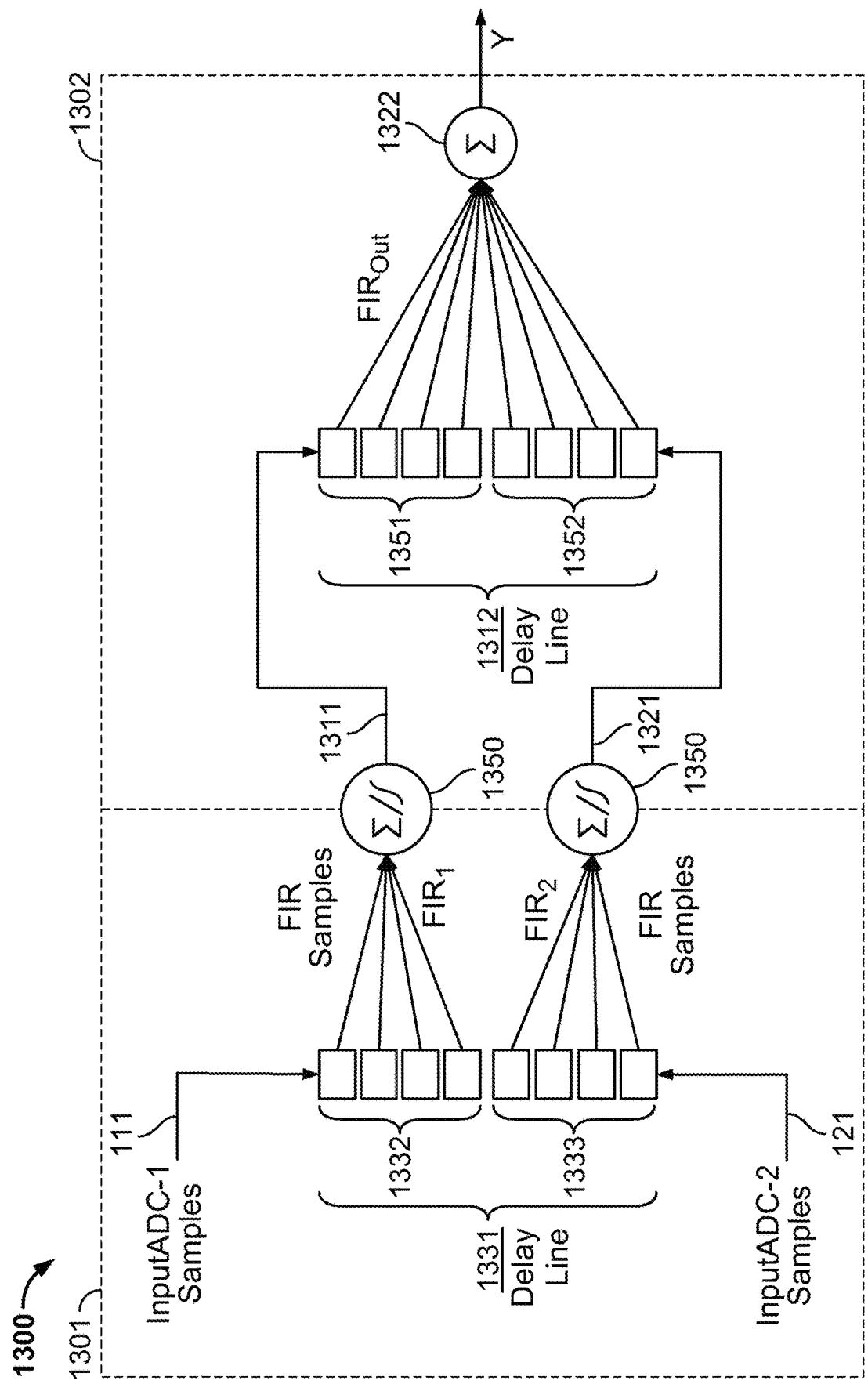
FIG. 14 is a diagram of a third implementation of a non-linear equalizer in the class of reduced-complexity non-linear neural network filters shown generically in FIG. 11.

A third implementation of a reduced-complexity non-linear neural network filter 1300, shown in FIG. 14, is based on a multilayer perceptron (MLP) non-linear neural network filter 1302, with a finite-impulse-response-(FIR)-based front-end filter 1301.

Typically, an MLP filter includes a delay line for input samples, followed by at least one hidden layer in which the samples are summed and then passed through a non-linear activation function such as, e.g., a hyperbolic tangent function tanh ($f$), followed by a layer including one or more summations.

In finite-impulse-response-(FIR)-based front-end filter 1301, delay line 1331 is divided into a first portion 1332 receiving inputs 111 and a second portion 1333 receiving inputs 121. Each line connecting a delay 1312 to sum 1322 represents a multiplication of a sample by a coefficient (not shown; see discussion above in connection with FIG. 12) forming a FIR filter tap. The taps are summed by the summation portion of each hidden node 1350, which includes a summation function followed by a non-linear activation function which in this implementation is a tanh ($f$) function. Although the hidden layer is shown as having only one hidden node 1350 for all of the inputs in each respective set of inputs 111, 121, in other implementations (not shown) there may be multiple nodes 1350 for each set of inputs 111, 121. In any event, a set of outputs 1311 is generated based on front-end filtering of inputs 111, and another set of outputs 1321 is generated based on front-end filtering of inputs 121.

In this implementation, the boundary between the front-end filter 1301 and the MLP non-linear neural network filter 1302 runs through the hidden layer of hidden nodes 1350, but that is not necessarily the case in all implementations.

MLP non-linear neural network filter 1302 in this implementation includes a respective tanh ($f$) non-linear activation function as part of each respective one of hidden nodes 1350 and a FIR filter formed by a delay line 1312 and a summation node 1322. A portion 1351 of delay line 1312 receives output samples 1311 from front-end filter 1302, while a portion 1352 of delay line 1312 receives output samples 1321 from front-end filter 1301. Each line connecting a delay 1312 to sum 1322 represents a multiplication of a sample by a coefficient (not shown; see discussion above in connection with FIG. 12) forming a FIR filter tap, and the taps are combined at summation node 1322 to yield the output Y.

Figure 15:
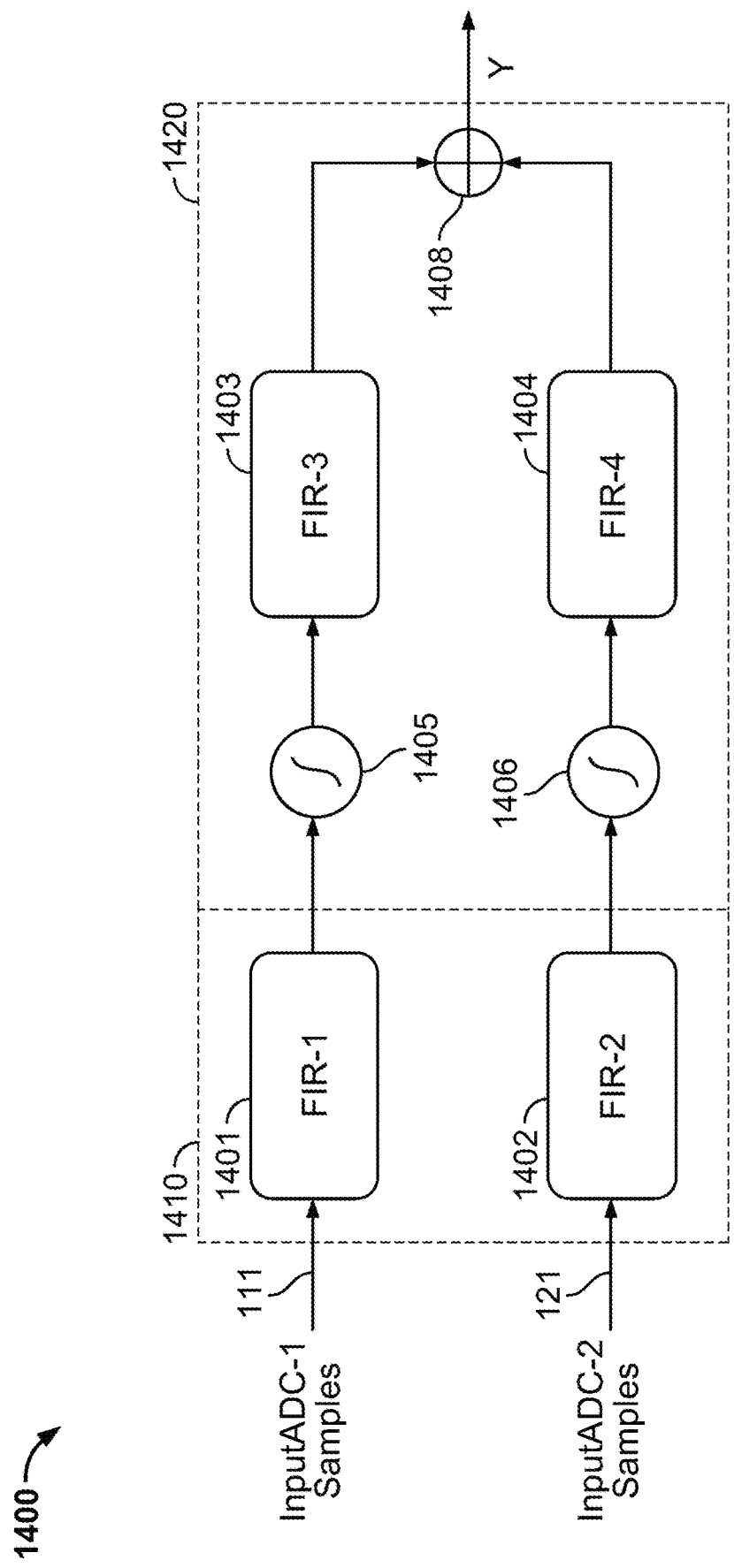
FIG. 15 is a diagram of an alternative representation of the implementation of a reduced-complexity non-linear neural network filters shown in FIG. 14.

Reduced-complexity non-linear neural network filter 1300 may be represented as an equivalent filter arrangement 1400, shown in FIG. 15. Reduced-complexity non-linear neural network filter 1400 includes four FIR filters 1401, 1402, 1403, 1404, and two non-linear activation functions 1405, 1406 (which may be respective tanh ($f$) non-linear activation functions).

FIR filters 1401, 1402 form finite-impulse-response-(FIR)-based front-end filter 1410, with FIR filter 1401 receiving inputs 111 while FIR filter 1402 receives inputs 121. FIR filters 1403, 1404 and non-linear activation functions 1405, 1406 form reduced-complexity non-linear neural network 1420. In reduced-complexity non-linear neural network 1420, activation function 1405 receives the outputs of FIR filter 1401 and passes those outputs, after non-linear activation, to FIR filter 1403, while activation function 1406 receives the outputs of FIR filter 1402 and passes those outputs, after non-linear activation, to FIR filter 1404. The outputs of FIR filter 1403 and FIR filter 1404 are combined at summation node 1408 to yield the output Y.

Figure 16:
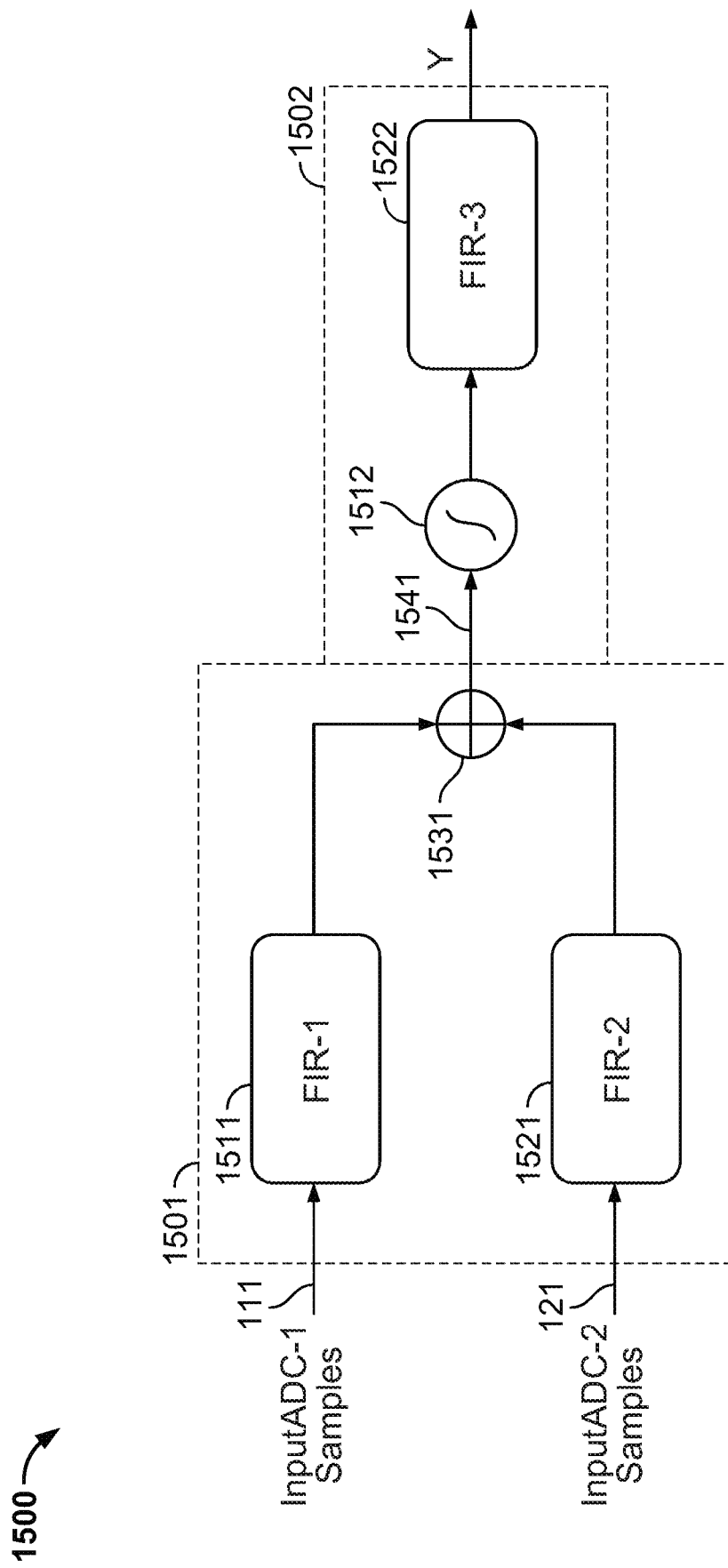
FIG. 16 is a diagram of a fourth implementation of a non-linear equalizer in the class of reduced-complexity non-linear neural network filters shown generically in FIG. 11.

Another implementation of a reduced-complexity non-linear neural network filter 1500, shown in FIG. 16, also is based on a multilayer perceptron (MLP) non-linear neural network filter 1502, with a finite-impulse-response-(FIR)-based front-end filter 1501. In this implementation 1500, finite-impulse-response-(FIR)-based front-end filter 1501 includes two FIR filters 1511, 1521, each of which filters a respective set of inputs 111, 121. The respective outputs of FIR filters 1511, 1521 are combined by summation node 1531.

The outputs 1541 of finite-impulse-response-(FIR)-based front-end filter 1501 are then filtered by multilayer perceptron (MLP) non-linear neural network filter 1502, which includes a non-linear activation function 1512 (which may be a tanh (ƒ) non-linear activation function), followed by FIR filter 1522.

Figure 17:
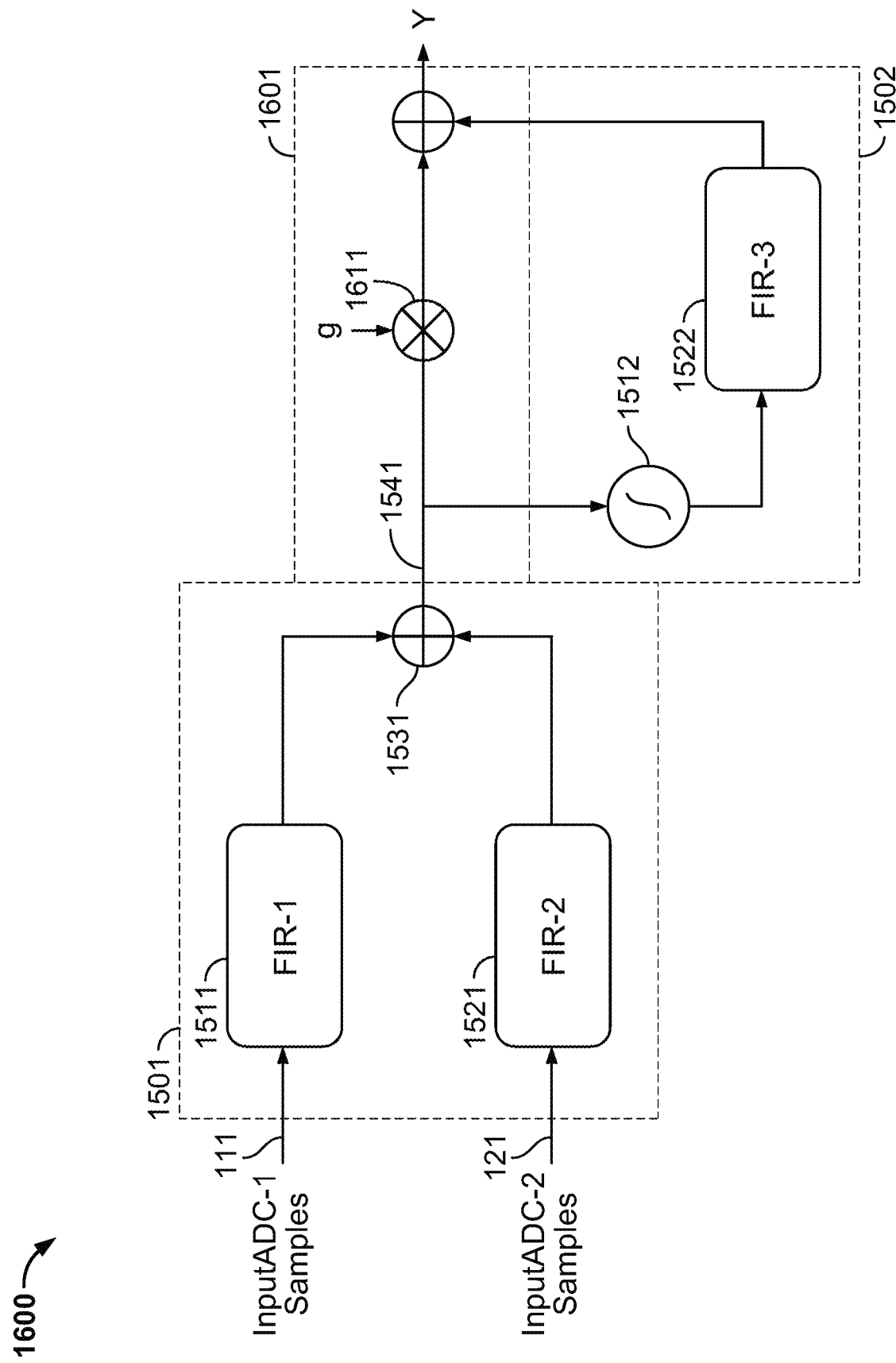
FIG. 17 is a diagram of a fifth implementation of a non-linear equalizer in the class of reduced-complexity non-linear neural network filters shown generically in FIG. 11.

In a variation 1600 of reduced-complexity non-linear neural network filter 1500, shown in FIG. 17, a scalable bypass path 1601 is provided around non-linear neural network filter 1502. Scalable bypass path 1601 is controlled by a scaling factor g (1611). FIR filter 1522 inherently includes a similar scaling control. The provision of scalable bypass path 1601 allows several modes of operation. First, if g=0, reduced-complexity non-linear neural network filter 1600 operates identically to reduced-complexity non-linear neural network filter 1500. Second, by setting g=1, and setting the scaling factor of FIR filter 1522 to 0, reduced-complexity non-linear neural network filter 1600 operates as a linear filter. This linear mode may be used as a "jump start" mode while the non-linear portion of the filter is adapting.

Figure 18:
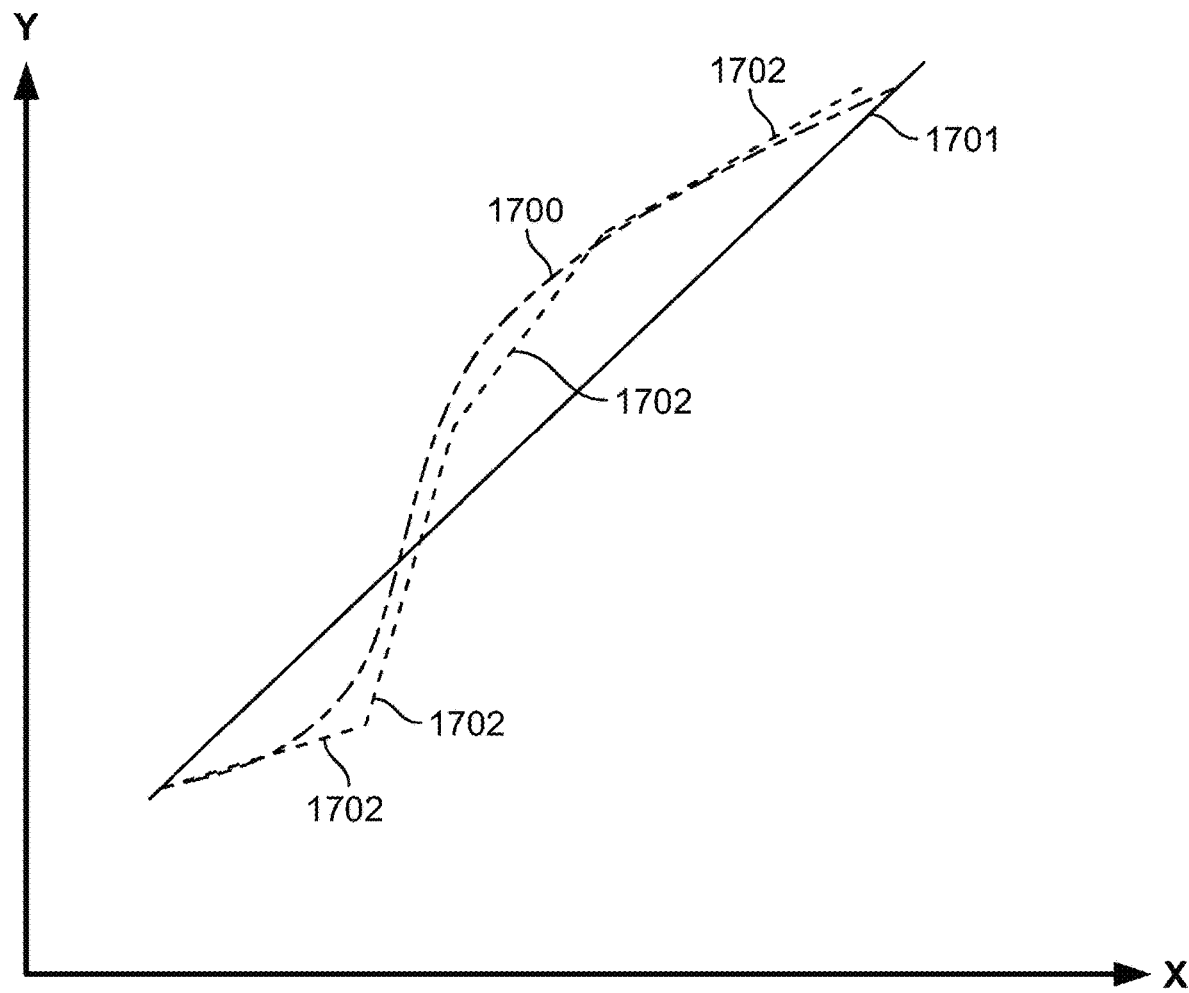
FIG. 18 is a graphic representation of a non-linear function that may be equalized using the reduced-complexity non-linear neural network filter of FIG. 17.

In addition, a non-linear function 1700 (particularly one that is close to a linear function 1701) can be approximated as a series of linear functions 1702 of different slopes, as shown in FIG. 18. By varying g to vary the slopes, non-linear function 1700 can be filtered using mostly finite-impulse-response-(FIR)-based front-end filter 1501, which is linear, with non-linear neural network filter 1502 correcting for the differences between the segmented linear approximation and the actual non-linear function.

Figure 19:
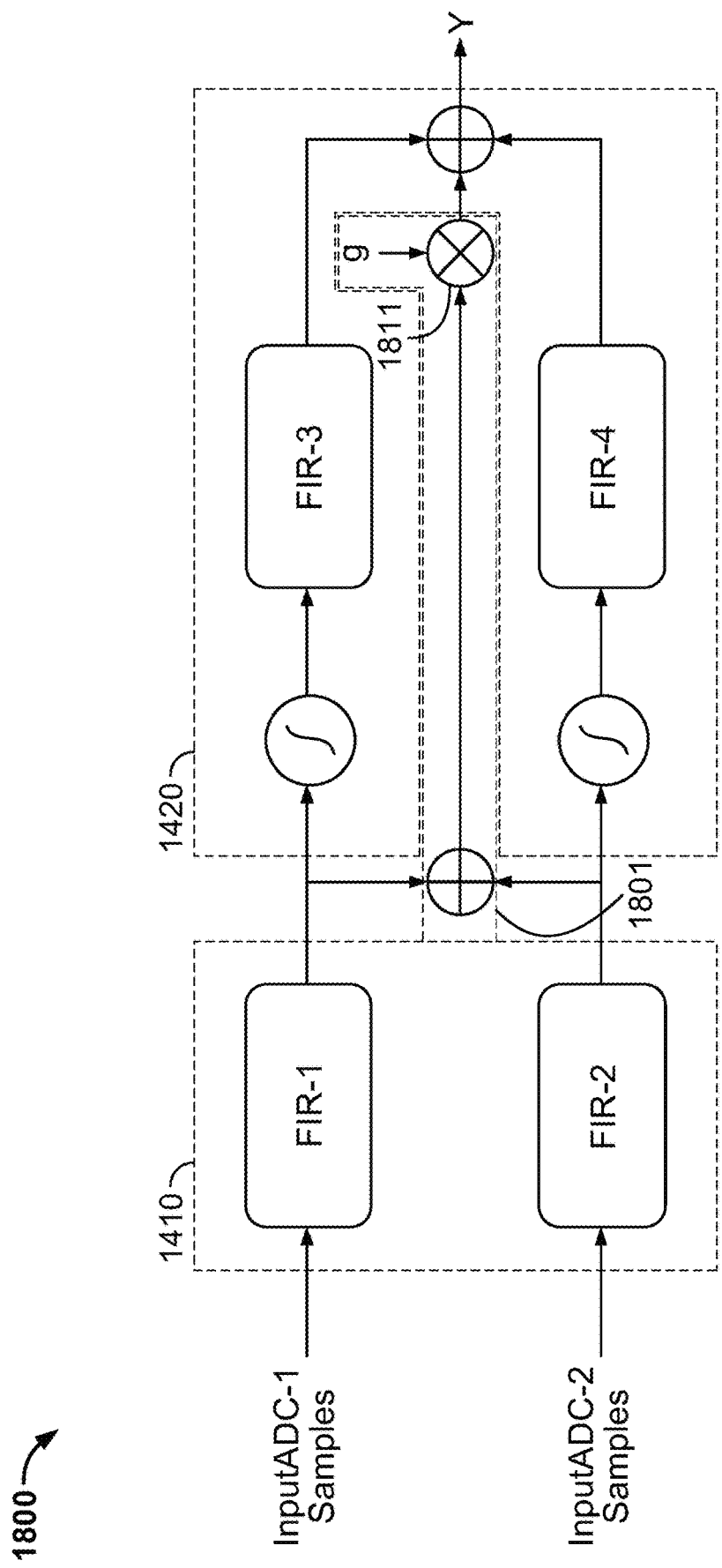
FIG. 19 is a diagram of a sixth implementation of a non-linear equalizer in the class of reduced-complexity non-linear neural network filters shown generically in FIG. 11.

A similar variation 1800, based on reduced-complexity non-linear neural network filter 1400, is shown in FIG. 19. A scalable bypass path 1801 is provided around non-linear neural network filter 1420. Scalable bypass path 1801 is controlled by a scaling factor g (1811). FIR filters 1403, 1404 of non-linear neural network filter 1420 inherently include a similar scaling control. By controlling g at 1811, non-linear neural network filter 1800 can be operated in various modes in a manner similar to non-linear neural network filter 1600.

In each of the implementations shown, additional filter layers or stages may be added (not shown). For example, when nonlinearity in the channel is severe or interference length in the time domain is longer, then more than one nonlinear transformation may be needed to separate signals. Each nonlinear stage would transform its input to a different space at the output. After multiple transformations, a final space would result where signals can be then linearly separated. In the implementations of FIGS. 15-17 and 19, each additional layer might include an additional non-linear activation function followed by an additional FIR filter.

Moreover, as discussed above in connection with the delay-line implementations, the delay line could be segmented into groups of delays corresponding to different groups of inputs. Similarly, in the activation-function-plus-FIR-filter implementations, additional parallel sets of activation functions and FIR filters can be provided, feeding the common summation node or nodes.

It can be shown that the various implementations of a reduced-complexity non-linear neural network filter shown above provide nearly as good performance as a non-reduced-complexity non-linear neural network filter, particularly when adapted using cross-entropy. However, the reduced complexity provides substantial savings in device area and power consumption.

Figure 20:
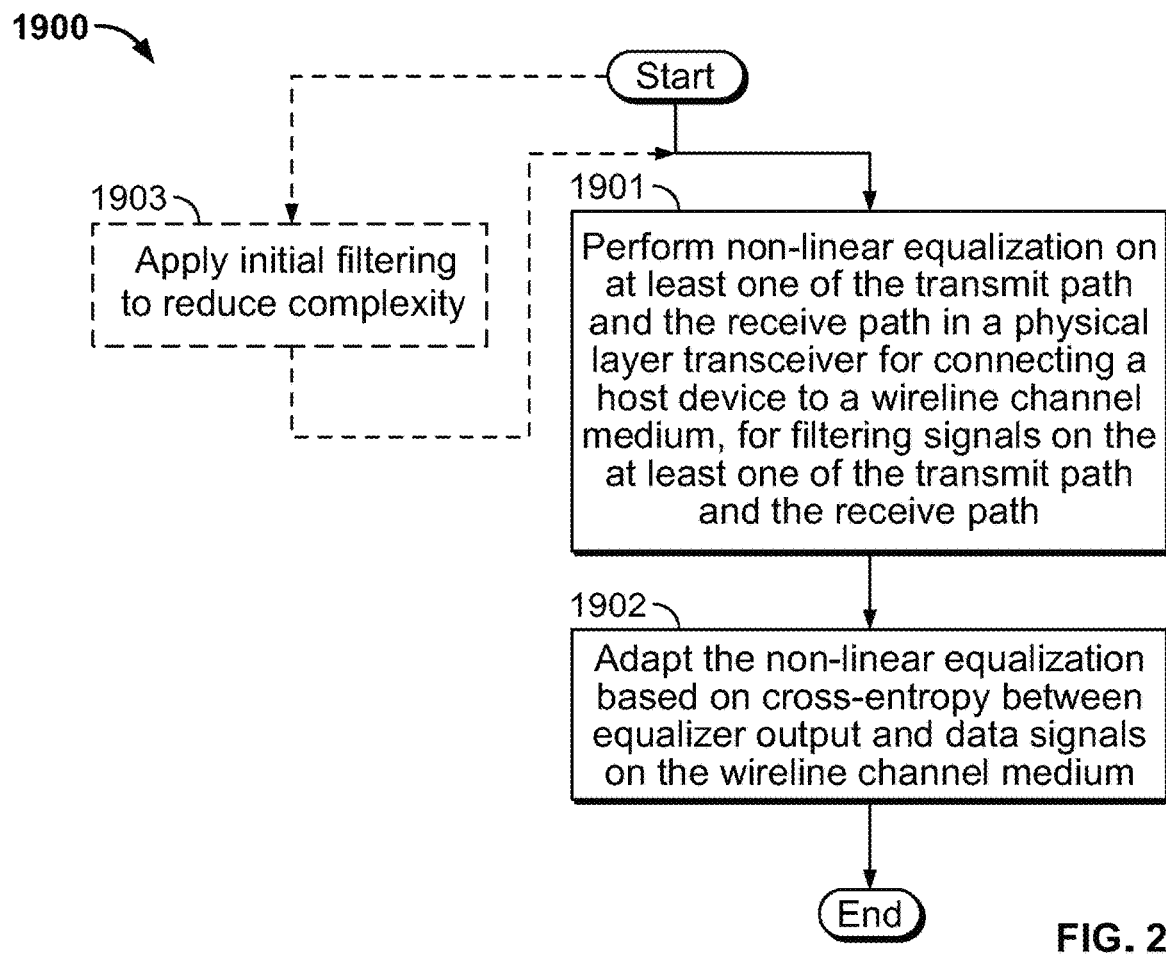
FIG. 20 is a flow diagram illustrating a method according to implementations of the subject matter of this disclosure.

A method 1900 according to implementations of the subject matter of this disclosure is diagrammed in FIG. 20.

Method 1900 begins at 1901 where non-linear equalization is performed on at least one of the transmit path and the receive path in a physical layer transceiver for connecting a host device to a wireline channel medium, for filtering signals on the at least one of the transmit path and the receive path. At 1902, the non-linear equalization is adapted based on cross-entropy between equalizer output and data signals on the wireline channel medium, and method 1900 ends. However, as seen at 1903, optionally (indicated by dashed lines), initial filtering—e.g., finite-impulse-response (FIR) filtering—may be applied prior to the non-linear equalization to reduce complexity of the non-linear equalization.

Figure 21:
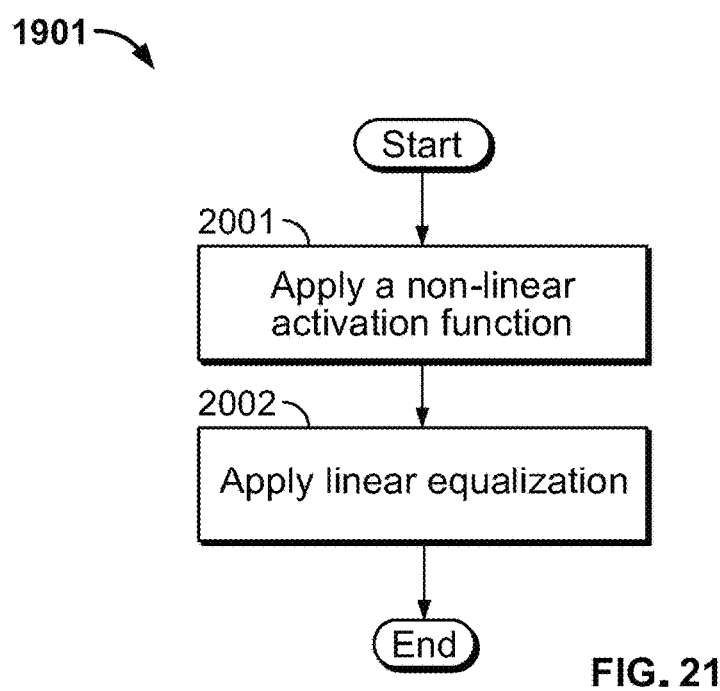
FIG. 21 is a flow diagram illustrating a portion of the method of FIG. 20.

As seen in FIG. 21, one implementation of performing non-linear equalization at 1901 may include applying a non-linear activation function—e.g., a tanh (ƒ) function—at 2001, and then performing linear equalization at 2002.

Thus it is seen that a physical layer transceiver using non-linear neural-network equalizers in the transmit and/or receive paths, and/or for cancellation echo, near-end crosstalk, and far-end crosstalk, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver for connecting a host device to a wireline channel medium, the physical layer transceiver comprising:
   a host interface for coupling to the host device;
   a line interface for coupling to the wireline channel medium;
   a transmit path operatively coupled to the host interface and the line interface, including circuitry for encoding host data and driving multi-level encoded host data onto the wireline channel medium;
   a receive path operatively coupled to the line interface and the host interface, including circuitry for decoding multi-level data received from the wireline channel medium and passing the decoded data to the host interface;
   adaptive filter circuitry operatively coupled to at least one of the transmit path and the receive path for filtering signals on the at least one of the transmit path and the receive path, the adaptive filter circuitry comprising a non-linear equalizer; and
   adaptation circuitry configured to compare output of the adaptive filter circuitry to known data, and to adapt the adaptive filter circuitry, by adjusting parameters of the adaptive filter circuitry, based on cross-entropy between a respective multi-bit symbol and a log-likelihood ratio corresponding to the respective multi-bit symbol.

2. The physical layer transceiver of claim 1, wherein the adaptive filter circuitry comprises a non-linear equalizer inline in the transmit path and configured to equalize transmit signals.

3. The physical layer transceiver of claim 1, wherein the adaptive filter circuitry comprises a non-linear equalizer inline in the receive path and configured to equalize received signals.

4. The physical layer transceiver of claim 1, wherein the adaptive filter circuitry comprises non-linear echo cancellation circuitry coupled to both the transmit path and the receive path and configured to cancel echo between the transmit path and the receive path.

5. The physical layer transceiver of claim 4, wherein the adaptive filter circuitry comprises non-linear echo cancellation circuitry operating in an analog domain of the physical layer transceiver.

6. The physical layer transceiver of claim 4, wherein the adaptive filter circuitry comprises non-linear echo cancellation circuitry operating in a digital domain of the physical layer transceiver.

7. The physical layer transceiver of claim 4, wherein the adaptive filter circuitry comprises non-linear crosstalk cancellation circuitry coupled to both the transmit path and the receive path for cancelling at least one of (a) near-end crosstalk, and (b) far-end crosstalk, between the transmit path and the receive path.

8. The physical layer transceiver of claim 1, wherein the non-linear equalizer comprises a neural network equalizer.

9. The physical layer transceiver of claim 8, wherein the neural network equalizer comprises a multi-layer perceptron neural network equalizer.

10. The physical layer transceiver of claim 8, wherein the neural network equalizer comprises a radial-basis function neural network equalizer.

11. The physical layer transceiver of claim 8, wherein the neural network equalizer is a reduced complexity neural network equalizer including a front-end filter having a first number of inputs and a second number of outputs, the second number being smaller than the first number, and a neural network filter having as inputs the outputs of the front-end filter.

12. The physical layer transceiver of claim 11, wherein the front-end filter of the reduced complexity neural network equalizer comprises a finite-impulse-response filter to reduce the first number of inputs to the second number of inputs.

13. The physical layer transceiver of claim 1, wherein the non-linear equalizer comprises a linear filter and a non-linear activation function.

14. The physical layer transceiver of claim 13, wherein the non-linear activation function is a hyperbolic tangent function.

15. The physical layer transceiver of claim 13, wherein the non-linear activation function is a sigmoid function.

16. A method of filtering interference in a physical layer transceiver for connecting a host device to a wireline channel medium, the method comprising:
performing non-linear equalization on at least one of a transmit path and a receive path for filtering multi-level signals on the at least one of the transmit path and the receive path; and
adapting a non-linear equalizer, by adjusting parameters of the non-linear equalizer, based on cross-entropy between multi-bit symbols in equalizer output and multi-bit symbols in data signals on the wireline channel medium.

17. The method of filtering interference in a physical layer transceiver according to claim 16, wherein performing non-linear equalization on at least one of the transmit path and the receive path comprises performing non-linear equalization inline in the transmit path to equalize transmit signals.

18. The method of filtering interference in a physical layer transceiver according to claim 16, wherein performing non-linear equalization on at least one of the transmit path and the receive path comprises performing non-linear equalization inline in the receive path to equalize received signals.

19. The method of filtering interference in a physical layer transceiver according to claim 16, wherein performing non-linear equalization comprises performing non-linear echo cancellation between the transmit path and the receive path.

20. The method of filtering interference in a physical layer transceiver according to claim 16, wherein performing non-linear equalization comprises performing non-linear crosstalk cancellation for cancelling at least one of (a) near-end crosstalk, and (b) far-end crosstalk, between the transmit path and the receive path.

21. The method of filtering interference in a physical layer transceiver according to claim 16, wherein performing non-linear equalization comprises applying a non-linear activation function and performing linear filtering.

22. The method of filtering interference in a physical layer transceiver according to claim 21, wherein applying a non-linear activation function comprises applying a hyperbolic tangent function.

23. The method of filtering interference in a physical layer transceiver according to claim 21, wherein applying a non-linear activation function comprises applying a sigmoid function.

24. The method of filtering interference in a physical layer transceiver according to claim 16, further comprising applying initial filtering of equalization inputs prior to performing the non-linear equalization, to reduce complexity by reducing number of inputs to the non-linear equalization.

25. The method of filtering interference in a physical layer transceiver according to claim 24, wherein applying initial filtering comprises applying finite-impulse-response filtering.

* * * * *